US011869152B2

(12) United States Patent
Koh et al.

(10) Patent No.: US 11,869,152 B2
(45) Date of Patent: Jan. 9, 2024

(54) GENERATION OF PRODUCT MESH AND PRODUCT DIMENSIONS FROM USER IMAGE DATA USING DEEP LEARNING NETWORKS

(71) Applicant: Bodygram, Inc., New York, NY (US)

(72) Inventors: Chong Jin Koh, Las Vegas, NV (US); Kyohei Kamiyama, Tokyo (JP); Nobuyuki Hayashi, Tokyo (JP)

(73) Assignee: Bodygram, Inc., New York, NY (US)

( * ) Notice: Subject to any disclaimer, the term of this patent is extended or adjusted under 35 U.S.C. 154(b) by 0 days.

(21) Appl. No.: 17/924,994

(22) PCT Filed: May 11, 2021

(86) PCT No.: PCT/US2021/070533
§ 371 (c)(1),
(2) Date: Nov. 12, 2022

(87) PCT Pub. No.: WO2021/232049
PCT Pub. Date: Nov. 18, 2021

(65) Prior Publication Data
US 2023/0186567 A1  Jun. 15, 2023

Related U.S. Application Data

(60) Provisional application No. 63/024,353, filed on May 13, 2020.

(51) Int. Cl.
*G06T 19/00* (2011.01)
*G06T 7/60* (2017.01)
(Continued)

(52) U.S. Cl.
CPC ......... *G06T 19/00* (2013.01); *G06Q 30/0621* (2013.01); *G06Q 30/0643* (2013.01);
(Continued)

(58) Field of Classification Search
None
See application file for complete search history.

(56) References Cited

U.S. PATENT DOCUMENTS 7,079,134 B2 * 7/2006 Kung ..................... G06T 17/00
345/420
10,507,087 B2 * 12/2019 Elbaz ................... A61B 5/1079
(Continued)

FOREIGN PATENT DOCUMENTS

WO  2009090391 A1  7/2009

OTHER PUBLICATIONS

Seok et al., Machine translated Korean Patent Pub. KR 20160107655, published Sep. 19, 2016 (Year: 2016).*
(Continued)

*Primary Examiner* — Saptarshi Mazumder
(74) *Attorney, Agent, or Firm* — American Patent Agency PC; Daniar Hussain; Stephen M. Hou

(57) ABSTRACT

The present invention provides systems and methods for generating a 3D product mesh model and product dimensions from user images. The system is configured to receive one or more images of a user's body part, extract a body part mesh having a plurality of body part key points, generate a product mesh from an identified subset of the body part mesh, and generate one or more product dimensions in response to the selection of one or more key points from the product mesh. The system may output the product mesh, the product dimensions, or a manufacturing template of the product. In some embodiments, the system uses one or more machine learning modules to generate the body part mesh, identify the subset of the body part mesh, generate the product mesh, select the one or more key points, and/or generate the one or more product dimensions.

25 Claims, 14 Drawing Sheets

(51) Int. Cl.
*G06Q 30/0601* (2023.01)
*G06T 17/20* (2006.01)

(52) U.S. Cl.
CPC ............... *G06T 7/60* (2013.01); *G06T 17/20* (2013.01); *G06T 2207/20081* (2013.01); *G06T 2207/30196* (2013.01); *G06T 2219/012* (2013.01)

(56) References Cited

U.S. PATENT DOCUMENTS

| | | | |
|---|---|---|---|
| 10,706,622 B2 * | 7/2020 | Wang | G06T 7/344 |
| 11,132,474 B2 * | 9/2021 | Suessmuth | G06F 30/00 |
| 2015/0127132 A1 | 5/2015 | Nyong'o et al. | |
| 2016/0062152 A1 * | 3/2016 | Fonte | G02C 13/005 351/204 |
| 2017/0080172 A1 | 3/2017 | Karpas et al. | |
| 2018/0240280 A1 | 8/2018 | Chen et al. | |
| 2019/0179405 A1 * | 6/2019 | Sun | G06F 1/1686 |
| 2020/0193591 A1 | 6/2020 | Kamiyama et al. | |
| 2020/0358983 A1 * | 11/2020 | Astarabadi | G06V 40/171 |
| 2021/0118239 A1 * | 4/2021 | Santesteban | G06Q 10/067 |
| 2021/0358190 A1 * | 11/2021 | Choi | G06T 19/20 |

OTHER PUBLICATIONS

Hoon, Machine translated Korean Patent 20110136562, published Dec. 21, 2011 (Year: 2011).*

The 3D Handyman, "Custom 3D Printed Respirator Face Mask V1", Youtube video, Mar. 24, 2020, pp. 1-3. Available at: https://www.youtube.com/watch?v=kBQcNBPRkh0.

Koriukina, "Using Facial Landmarks for Overlaying Faces with Masks", LearnOpenCV article, Aug. 17, 2020, pp. 1-19. Available at: https://learnopencv.com/using-facial-landmarks-for-overlaying-faces-with-masks/.

* cited by examiner

GENERATION OF PRODUCT MESH AND PRODUCT DIMENSIONS FROM USER IMAGE DATA USING DEEP LEARNING NETWORKS

FIELD OF THE INVENTION

Embodiments of the present invention are in the field of generating a 3D mesh model and dimensions of a product. Some embodiments pertain particularly to generating a product mesh and dimensions from a body part mesh generated from images taken with an electronic device.

BACKGROUND OF THE INVENTION

The statements in the background of the invention are provided to assist with understanding the invention and its applications and uses, and may not constitute prior art.

Obtaining an accurate virtual representation of a product has many useful applications, particularly for wearable products such as face masks. First, it allows for a speedy and accurate estimate of the product's required dimensions and other attributes before acquisition or manufacturing. It also facilitates product personalization and enables stronger product differentiation, as users start participating to the selection and manufacturing process. Improving the product's fit leads to heightened comfort levels. This is particularly important when the product is worn for extended periods of time, such as medical gear, jewelry, and prostheses. Ultimately, an accurate virtual representation of a product enables on-demand manufacturing (e.g., 3D printing).

Owing to the ubiquity of mobile electronic devices, one important aspect of accurate virtual product representations is the facilitation of product visualization, whereby customers may see and customize a product before ordering it. This boosts customer satisfaction and purchase rate while accelerating potential positive social media reactions to the product, leading to frequent viral sharing of positive customer experiences.

Obtaining virtual product representations and measurements is difficult as it requires accurate body part measurements, often relying on hardware components (e.g., 3D scanners or sensors) that are either bulky, expensive, or unavailable. For example, it is hard to imagine equipping small garment stores with 3D scanners in order to sell small personalized accessories, such as sunglasses.

With the advent of smart phones, users have come to expect seamless and instantaneous user experiences that minimize friction, using general purpose hardware rather than specialized sensors or other scanning hardware. Consequently, the time, effort, and uncertainty related with product trial-and-error and in-store or in-person measurements are increasingly seen as a hindrance to a positive user experience. Furthermore, requiring users or retailers to purchase specialized scanners for body part measurements and product tailoring is not a feasible approach.

Therefore, it would be an advancement in the state of the art to provide a system and method for accurately generating a virtual product representation (e.g., a virtual 3D product model) that fits a user's body part from photos of a user taken using an ordinary electronic device, such as a smartphone camera. The benefit would be that everyone can easily take photos of themselves and instantly benefit from accurate product representation and measurement estimation.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

The present invention provides systems and methods for accurately generating a virtual 3D mesh model and one or more dimensions of a product from images of a user's relevant body part. The product may be wearable, have a wearable component, or have a body-adjustable component. Some embodiments use advanced computer vision (CV) combined with machine learning (ML) techniques to generate accurate mesh representations and dimensions of the product. The machine learning modules may be trained on images collected from thousands of sample users. Some embodiments of the present invention leverage the AR (augmented reality) SDK (software development kit) provided in mobile computing devices.

Various methods and algorithms are within the scope of the present invention for generating a product mesh and one or more product dimensions using images of a user's body part taken, for example, using an electronic device such as a camera.

In one embodiment, a computer-implemented method for generating a 3D mesh model of a product for a user is disclosed, the method executable by a hardware processor, the method including the steps of receiving one or more images containing a body part of the user; extracting a body part mesh of the body part from the one or more images, where the body part mesh includes a plurality of body part key points of the body part, and where the extracting utilizes a key point deep learning module for generating the body part mesh from the one or more images; identifying a key point of the plurality of body part key points from the extracted body part mesh; and generating a product mesh based on the identified product mesh subset.

In another embodiment, the key point deep learning module has been trained on key point training data, and where the key point training data include one or more sample images for one or more sample users and a set of sample key points for the one or more sample users.

In yet another embodiment, the method further includes selecting one or more product key points of the product mesh and generating one or more product dimensions from the one or more product key points, where the one or more product dimensions constitute measurements of the product for the user.

In one embodiment, the selection of the one or more product key points of the product mesh includes determining one or more product constraints, where the one or more product constraints are selected from the group consisting of a product shape, a product size, a product length, a product height, a product width, a product thickness, a product color, a product pattern, a product finish, and a product style to match the surface of an anatomic feature of the user.

In another embodiment, the method further includes receiving a modification of the one or more product constraints, and updating the one or more dimensions of the product, based on the modification of the one or more product constraints.

In yet another embodiment, the one or more product dimensions define manufacturing dimensions of the product for the user.

In one embodiment, the method further includes generating a 2D template of the product for the user, where the 2D template is generated based on the manufacturing dimensions of the product for the user.

In another embodiment, the method further includes generating a product mesh template based on the one or more product dimensions.

In yet another embodiment, the method further includes identifying a matching product mesh template for the user and previewing the matching product mesh template with an item selected from the group consisting of the product mesh, the body part mesh, and the one or more images.

In one embodiment, the generating the one or more product dimensions utilizes a product dimensions deep learning module that has been trained on a product dimensions training data set, where the product dimensions training data set includes one or more sample product key points for one or more sample users and a set of sample product dimensions for the one or more sample users.

In another embodiment, the product is selected from the group consisting of a mask, an eyewear, a headwear, and a footwear.

In yet another embodiment, the method further includes generating a set of instructions for product manufacturing.

In one embodiment, the method further includes generating a set of instructions for an item selected from the group consisting of a product style, a product size, a product design, and a product composition.

In another embodiment, the one or more images include at least one of a front view of the user's face, a front view of the user's head, a side view of the user's face, a side view of the user's head, and a back view of the user's head.

In yet another embodiment, the method further includes scanning the body part of the user using a 3D scanner and capturing one of a front image, a back image, and a side view image of the body part from an output of the 3D scanner.

In one embodiment, the one or more images are received from a camera device on a mobile computing device.

In another embodiment, the method further includes the following step after the receiving the one or more images: identifying a plurality of additional key points of the body part utilizing an additional key point deep learning module that has been trained on additional key point training data, where the additional key point training data include one or more additional sample images for one or more additional sample users and an additional set of sample key points for the one or more additional sample users, and where the plurality of additional key points are different from the plurality of body part key points.

In yet another embodiment, the identifying the product mesh subset of the plurality of body part key points from the body part mesh utilizes a product mesh subset deep learning module that has been trained on a product mesh subset training data set, where the product mesh subset training data set includes one or more sample body part meshes for one or more sample users and a set of sample product mesh subsets for the one or more sample users.

In one embodiment, the generating the product mesh based on the product mesh subset utilizes a product mesh deep learning module that has been trained on a product mesh training data set, where the product mesh training data set includes one or more sample product mesh subsets for one or more sample users and a set of sample product meshes for the one or more sample users.

In another embodiment, the product mesh deep learning module is based on a regressor.

In yet another embodiment, the extracting the body part mesh utilizes an AR (augmented reality) SDK (software development kit) provided in a mobile computing device.

In one embodiment, the product mesh includes the identified product mesh subset.

In another embodiment, the product mesh includes a plurality of new key points that are different from the plurality of body part key points.

In yet another embodiment, the product mesh is a configurable 3D mesh model that is based on a surface or a boundary of the body part mesh and that matches one or more anatomic features of the user.

In one embodiment, the product mesh is configured to allow a buffer space between the body part mesh and the product mesh in order to better fit an anatomic feature of the user.

In various embodiments, a computer program product is disclosed. The computer program may be used for generating a product mesh and one or more product dimensions using images of a user's body part, and may include a computer-readable storage medium having program instructions, or program code, embodied therewith, the program instructions executable by a processor to cause the processor to perform steps to the aforementioned steps.

Hence, in one embodiment, a non-transitory storage medium storing program code is disclosed, the program code executable by a hardware processor to execute a process for generating a 3D mesh model of a product, the program code configured to: receive one or more images containing a body part of the user; extract a body part mesh of the body part from the one or more images, where the body part mesh includes a plurality of body part key points of the body part, and where the extracting utilizes a key point deep learning module for generating the body part mesh of the body part of the user from the one or more images; identify a product mesh subset of the plurality of body part key points from the extracted body part mesh; and generate a product mesh, based on the identified product mesh subset.

In various embodiments, a system is described, including a memory that stores computer-executable components, and a hardware processor, operably coupled to the memory, and that executes the computer-executable components stored in the memory, where the computer-executable components may include components communicatively coupled with the processor that execute the aforementioned steps.

In another embodiment, the present invention is a non-transitory, computer-readable storage medium storing executable instructions, which when executed by a processor, causes the processor to perform a process for generating a 3D mesh model and/or dimensions of a product, the instructions causing the processor to perform the aforementioned steps.

In another embodiment, the present invention is a system for generating a 3D mesh model and/or dimensions of a product from user images, the system comprising a user device having a 2D camera, a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the aforementioned steps.

In yet another embodiment, the present invention is a computerized server comprising at least one processor, memory, and a plurality of computer codes embodied on said memory, said plurality of computer codes which when executed causes said processor to execute a process comprising the aforementioned steps. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the methods and devices described herein.

Embodiments of the present invention described herein are exemplary, and not restrictive. Embodiments will now be described, by way of examples, with reference to the accompanying drawings, in which.

DETAILED DESCRIPTION OF THE INVENTION

Figure 1:
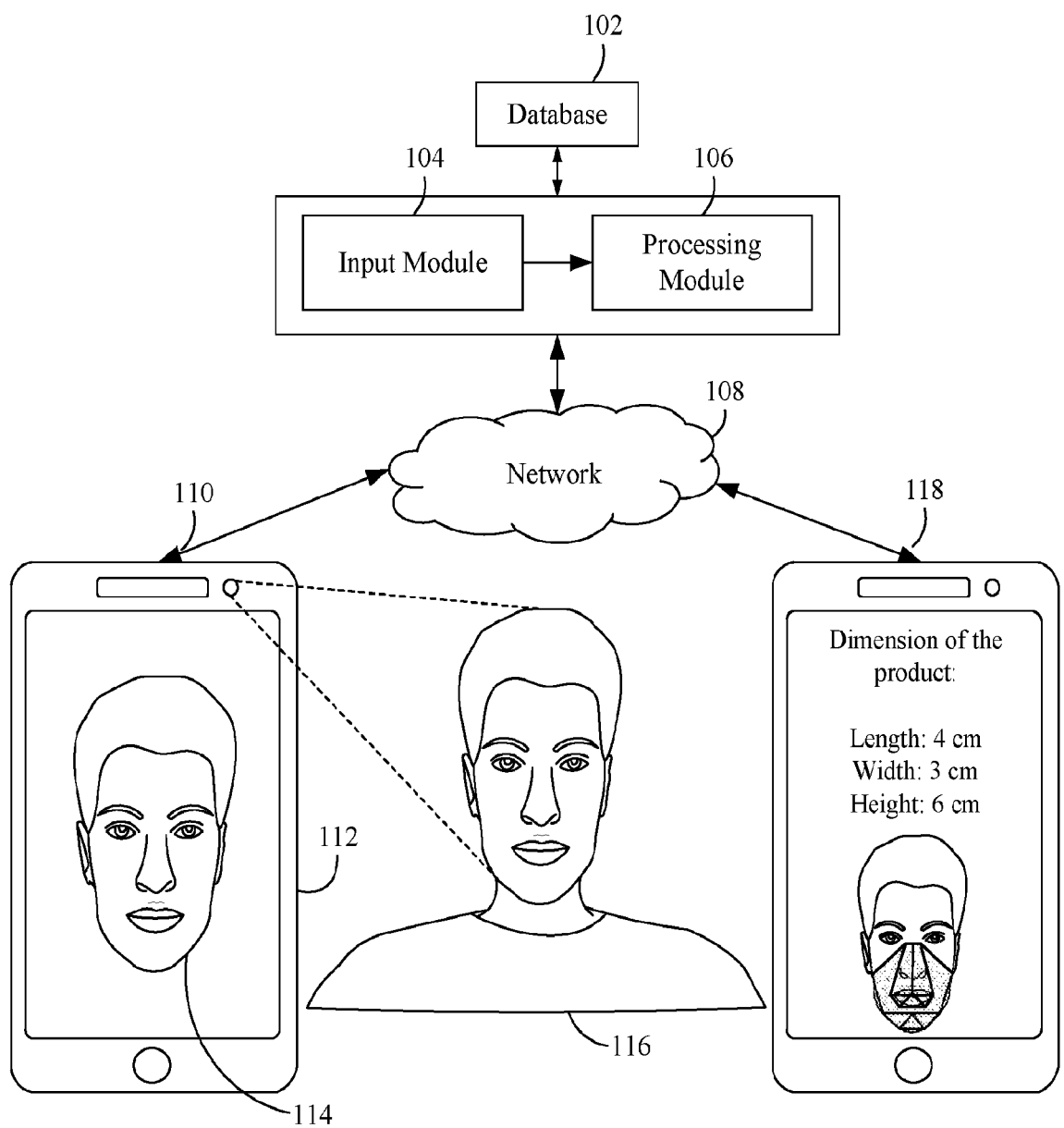
FIG. 1 illustrates a block diagram of a system for generating a mesh and dimensions of a product according to an embodiment of the present invention.

The present invention will be more completely understood through the following detailed description which should be read in conjunction with the attached drawing in which similar reference numbers indicate similar structures. All references cited above and in the following description are hereby expressly incorporated by reference.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

As used herein, the singular forms "a," "an," and "the" include plural references unless the context clearly indicates otherwise. Also as used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number +/−10%, such that "about 10" would include from 9 to 11.

BODYGRAM is a trademark name carrying embodiments of the present invention, and hence, the aforementioned trademark name may be used in the specification and drawing to refer to the products/manufacturing process offered by embodiments of the present invention. The term BODYGRAM and its equivalents may be used interchangeably in this specification to describe the present invention, as well as the company providing said invention. With reference to the figures, embodiments of the present invention are now described in detail.

Generating Product Mesh and Dimensions from User Images

FIG. 1 illustrates a block diagram of a system for generating a mesh and dimensions of a product according to an embodiment of the present invention.

While most of the examples described herein relate to masks and footwear, the product may be a mask, an eyewear, a footwear, a headwear, or any wearable product such as wearable fitness and health technology, medical gear (e.g., body part support), health garments, smart wearable devices, jewelry, glasses, watches, belts, wrist bands, bracelets, rings, prostheses, clothing garments, and accessories. In some cases, the product may be an adjustable component of a larger item that acts as receptacle of a user's body or body part, such as adjustable seats, safety harnesses, various control devices (e.g., driving wheel size and position) in vehicles, or adjustable medical equipment (e.g., remote surgery station controls).

The present invention provides a system for accurately extracting a 3D mesh model and dimensions for a device (e.g., a face mask) for a user from the user's images of a body part (e.g., face) captured via a camera (110) of an electronic device (112). The electronic device is at least one of the but not limited to smart phones, cameras, tablets, laptops, personal digital assistants (PDA), and desktops. In some embodiments, images may also be provided by a 3D scanner (i.e., 360 degree scanning of the user's face is carried out for capturing images at multiple angles). Advanced computer vision combined with deep-learning techniques are used to generate an accurate face mesh model.

The system includes an input module (104), a processing module (106), and an output module (118). The input module (104) is configured for receiving one or more images of at least a partial body part of a user via a network (108), for example, a front and/or side head view of the user (116) may be received. In one embodiment, the images may be images obtained from the electronic device (112) via a network (108). In another embodiment, the images may be obtained from a database (102).

The processing module (106) is configured to generate a 3D mesh model of the user's body part from the one or more images. In one embodiment, the 3D mesh model of the body part, also denoted a body part mesh, is a quantitative anatomic model of the user's body part (e.g., face) that is constructed from the one or more images received by the input module. The 3D mesh model is represented as a surface mesh or 3D mesh made of elements such as polygons, curvilinear elements, etc. The 3D mesh model is defined by key points generated from the one or more images of the user's body part. The 3D mesh model is altered based on location, curvature, and features on the face. In one example, the body part mesh is constructed only for the user's face. In one embodiment, a full 3D model of the entire head may be obtained by obtaining a plurality of images of the user's head from a plurality angles, and then stitched together using an appropriate algorithm, such as a photogrammetry algorithm. The generation of the body part mesh is further discussed in the context of FIG. 2.

Some embodiments of the present invention leverage the AR (augmented reality) SDK (software development kit) provided in mobile computing devices to generate the body part mesh.

In one embodiment, the mobile computing device can download and execute a measurement application for extracting the body part mesh and generating the product mesh and dimensions. In an embodiment of the invention, the measurement application is an Augmented Reality (AR) guided scanning application. The mobile computing device is placed at a predetermined position relative to the body part so that the camera on board the mobile application is focused on the body part. The measurement application is opened and a user operating the mobile computing device is requested to log in. Upon logging in, the user can either select to measure a body part or retrieve previously uploaded body part images in view of generating the product mesh and dimensions for a specific product. If the user selects to measure a body part, the user is provided with body part measurement instructions based on the user product selection. In order to be measured accurately, the body part may be imaged from different sides and different angles based on the instructions or directions provided by the measurement application, with the body part (e.g., face) maintained in the correct position based on the AR guides. Different sets of instructions can be provided for different body parts and products.

In some embodiments, a depth sensor or a lidar sensor is used to determine the scale reference. In another embodiment, a measurement of a horizontal reference plane or a ground plane is initially obtained using an augmented reality software development kit (AR-SDK), or an equivalent library or subroutine on the mobile computing device. For example, an AR-SDK developed for the Apple iPhone and described at https://developer.apple.com/documentation/arkit may be used. Other AR-SKDs may also be used, such as the Android AR-SDK described at https://outsourceittoday.com/ar-sdk-ios-android-development/. A computer vision software development kit (CV-SDK), or equivalent library or subroutine on the mobile computing device, is used to identify the object to be measured. For example, an CV-SDK developed for the Apple iPhone and described at: haps://developer.apple.com/documentation/vision may be used.

AR-SDKs that are pre-installed in user devices have multiple functions that may assist in the generation of a body part mesh. For example, one important function of AR-SDKs includes 3D image tracking, which requires the AR-SDKs to recognize and track 3D objects, including operations such as environment mapping and feature identification. Many AR-SDKs such as but not limited to, Vuforia, Kudan, ARKit from Apple®, ARCore from Google®, ARToolKit—an open-source tool, etc. are currently in use which offer different functionalities. For example, ARCore works with Java/OpenGL, Unity and Unreal and focuses on functions such as motion tracking using a smartphone's camera to observe feature points in a room. ARCore can determine both the position and orientation of the phone as it moves so that virtual objects (e.g., user body parts) can be accurately placed. Similarly, ARCore can detect horizontal surfaces using the same feature points that it uses for motion tracking. Detecting planes is another important function for AR-SDKs, as the AR experiences must be anchored to the detected planes. Different kinds of planes such as horizontal planes such as floor, table, ceiling, etc., vertical planes such as doors, walls, etc., or planes of arbitrary orientation such as ramps, etc. can be detected by some of the AR-SDKs.

The AR kit therefore provides for accurate extraction of the body part mesh using depth sensing of the body part key points. In one embodiment, the AR kit is used to generate a face surface mesh of the user's face by performing depth sensing on the user's face from an image taken with a mobile device camera.

Further, the processing module (106) is configured to execute instructions to extract a body part mesh, having a plurality of key points of the body part, identify a product mesh subset, including a subset of the key points from the body part mesh, generate a product mesh, and generate one or more dimensions of the product, in response to selection of one or more key points from the product mesh. The generation of the body part mesh, the product mesh subset, and the product mesh are further discussed in the context of FIG. 2. The output module (118) may be configured to output the one or more dimensions of the product to the user (116) on the software application running on the electronic device, via a network (108).

Figure 13:
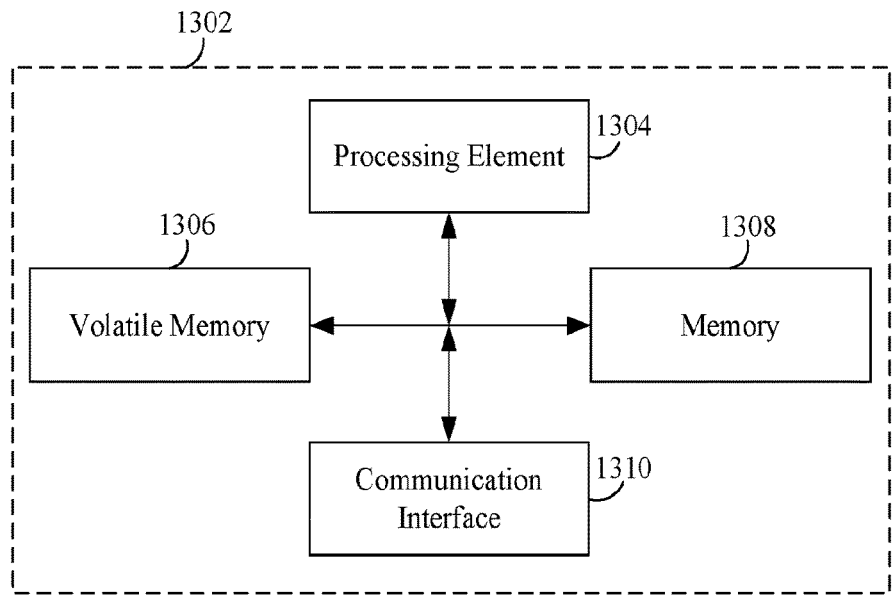
FIG. 13 provides a schematic of a server (management computing entity) according to one embodiment of the present invention.
Figure 14:
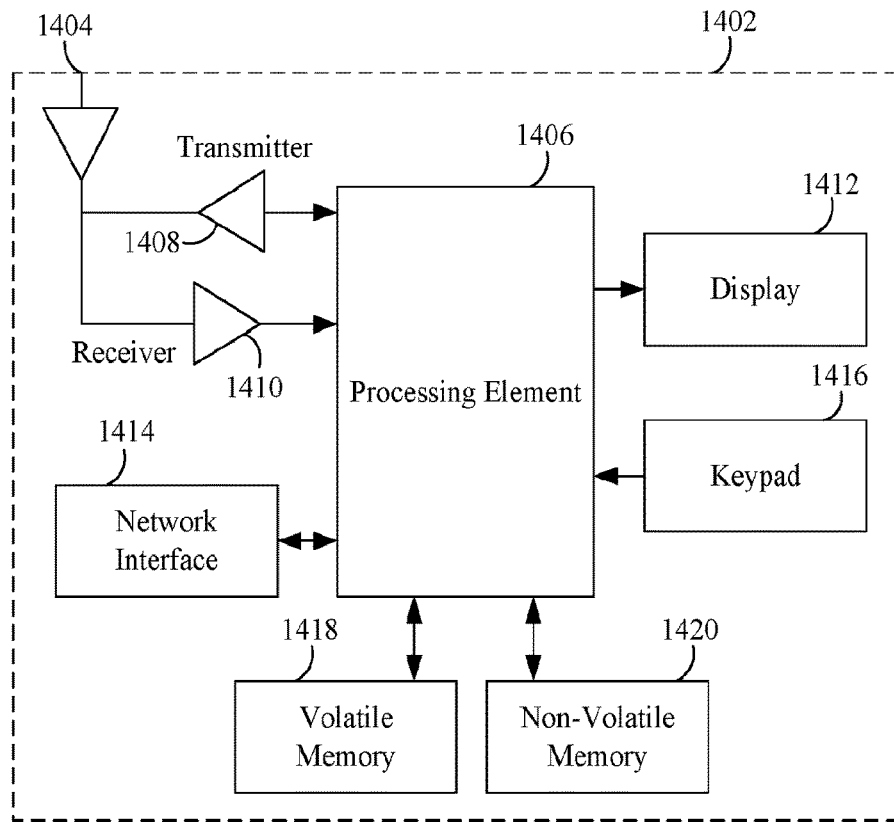
FIG. 14 provides an illustrative schematic representative of a client (user computing entity) that can be used in conjunction with embodiments of the present invention.
Figure 15:
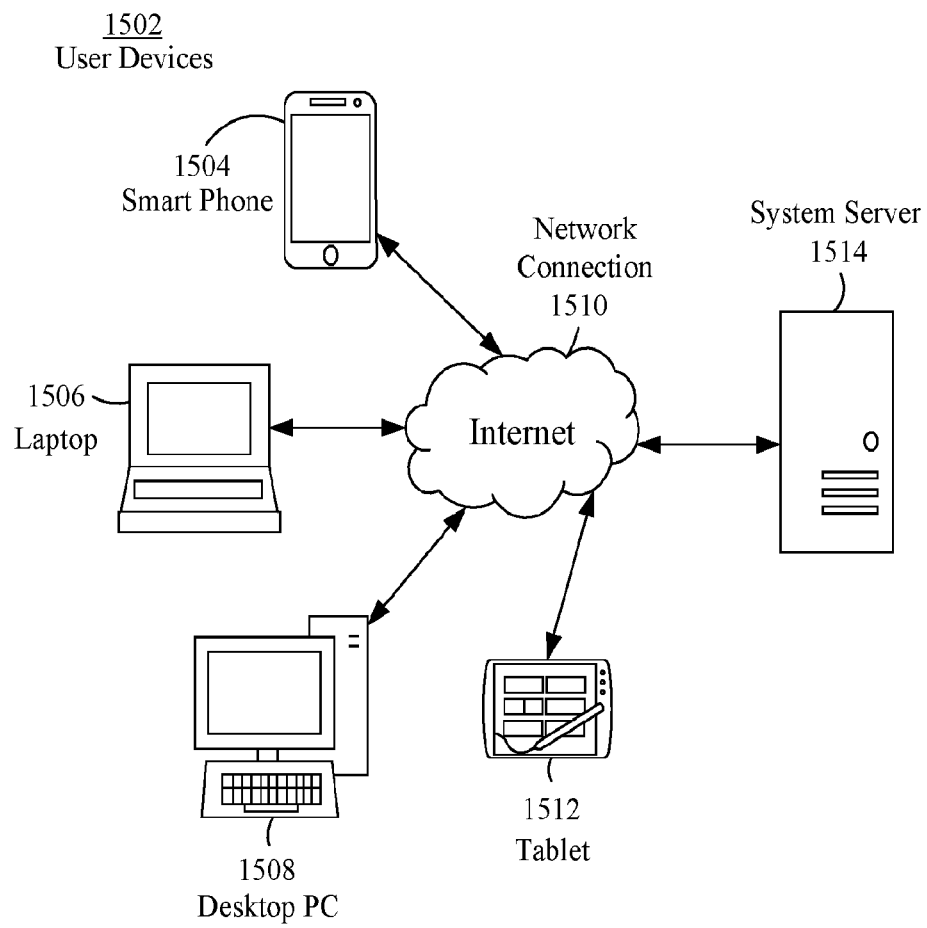
FIG. 15 shows an illustrative system architecture diagram for implementing one embodiment of the present invention in a client-server environment.

The network (108) may include wireless communication links, for example, shortwave, microwave, high frequency, wireless fidelity (Wi-Fi), Bluetooth technology, global system for mobile communications (GSM), code division multiple access (CDMA), second-generation (2G), third-generation (3G), fourth-generation (4G), 4G long term evolution (LTE), LTE Advanced, or any other wireless communication technology or standard to establish a wireless communication for exchanging data, as depicted in the contexts of FIGS. 13, 14, and 15.

In one exemplary embodiment, the output module is also configured to display at least a set of instructions for selecting or manufacturing the product based on the one or more dimensions of the product. The disclosed methods and systems also include the generation by the processor of any product characteristic that may be desirable by the user, from a body part mesh extracted from user images. For instance, a user having an athletic build may receive recommendations for sporty garments. Hence, in another embodiment, the output module is configured to output a recommended product style, product size, product composition, or product design on to a sheet of paper, a third-party website, a user device, or a server. Recommended product styles, sizes, compositions, and designs include any product attributes, other than exact dimensions, that may differentiate two products of the same category.

In particular, product styles may include lifestyle- and context-related product features. For example, products styles may include informal, casual, formal, professional, or sporty. Product sizes include standardized size categories that may appear on size charts, such as clothing, shoe, and/or hat sizes. The most common size charts include extra-small, small, medium, large, and extra-large. Product sizes include category-specific size charts such as women's U.S. 00-20 clothing size chart. Product sizes also include any gender and age-related size categorization such as "child", "girl", "boy", "man", "woman", "adult", etc. Product compositions refer to the materials used in the manufacturing of the product. Product compositions may thus include natural fabrics, artificial fabrics, paper, wood, metal, plastic, leather, recycled materials, and any combination and imitation thereof. Specific material subcategories (e.g., cotton, wool, linen), attributes (e.g., recycled, genetically modified organism (GMO)-free, fair-trade), and percentages (e.g., 50% recycled) may be part of a product composition. Product designs may include any specific manufacturing product blueprint, including any product attribute. For example, product design categories may depend on the inclusion and frequency of a specific subcomponent in the product (e.g., pockets, zippers, buttons, pins, laces, Velcro strips, belts, microchips, magnets, electronic components, etc.).

In one embodiment, the database 102 contains one or more product mesh templates, each including one or more measurements. In yet another example, the system is configured to generate a 3D mesh model of the at least one partial body part from the one or more images, identify the user's current best product mesh template, and preview each best product's mesh template with one of the body part mesh, the product mesh, an image of the user's body part, or an image of the user. The generation of a preview of the product, often as an overlay of the body part mesh or user image, is an important aspect of virtual product visualization.

Figure 2:
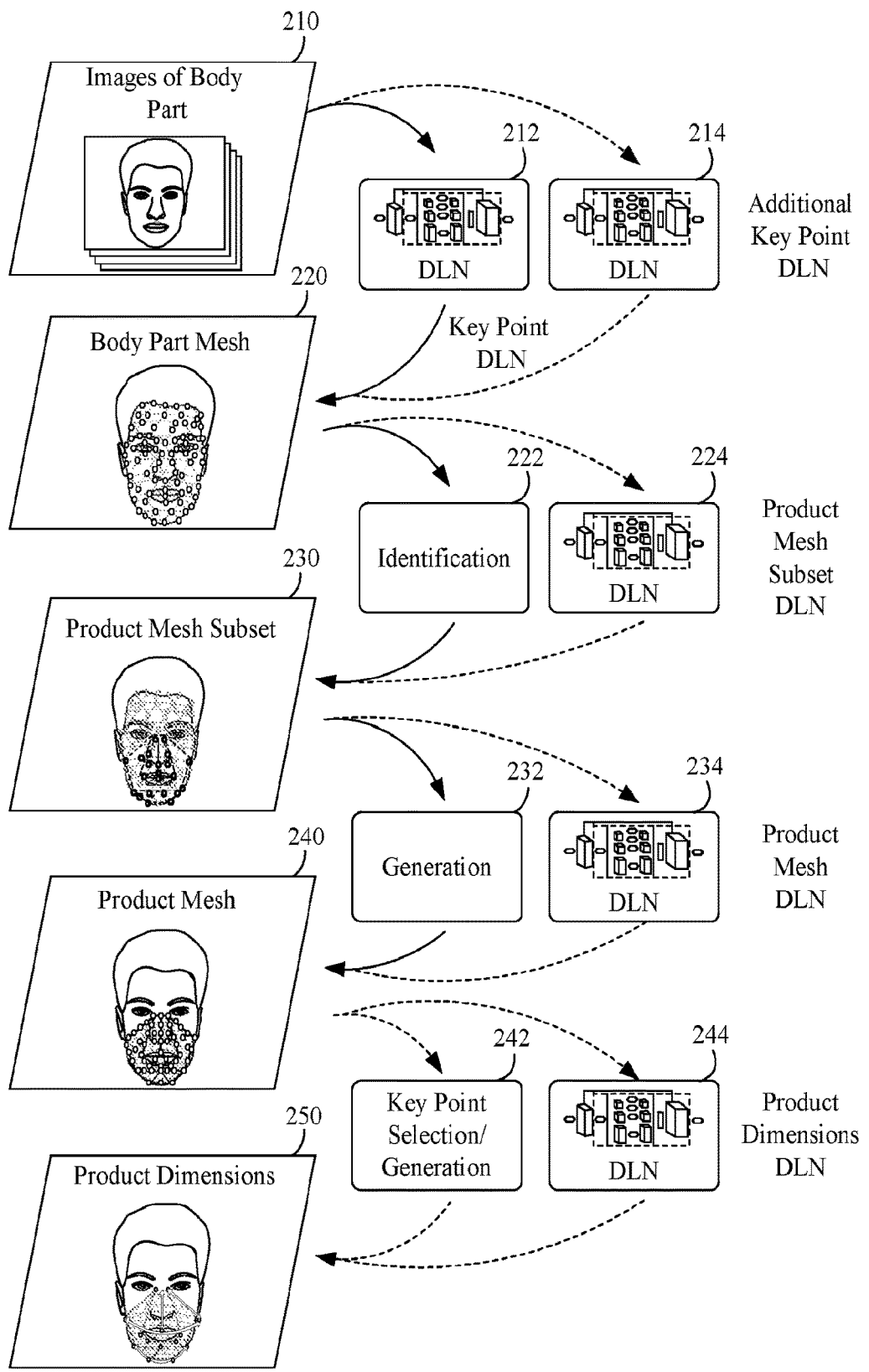
FIG. 2 illustrates an example block diagram for generating a mesh and dimensions of a face mask from user images using machine learning, in accordance with one embodiment of the present invention.

FIG. 2 illustrates an example block diagram for generating a mesh and dimensions of a face mask from user images using machine learning, in accordance with one embodiment of the present invention. FIG. 2 shows three major steps involved in the generation of a product mesh 240 from the images of the body part of a user 210, according to an embodiment of the present invention. The three steps include the extraction of a body part mesh 220, the identification of a product mesh subset 230, and the generation of a product mesh 240. An additional step consisting of the generation of product dimensions 250 based on a selection of one or more key points from the product mesh 240 is also shown.

In one embodiment, an AR-guided application within a mobile computing device is used as an interface to generate images of the body part 210. In one embodiment, the images of the body part 210 are generated from existing or newly captured images of the user. In the example of FIG. 2, for instance, images of the face 210 or the side of the head may be extracted from one or more existing user images.

A key point deep-learning network (DLN) 212 may be used to generate the body part mesh 220. In one embodiment, the key point DLN 212 is part of a 3D model generation module (not shown in FIG. 2) that uses the images of the body part 210 to build a scaled 3D model of the body part (i.e., the body part mesh 220) in virtual 3D space. In one embodiment, the 3D model generation module including the key point DLN 212 generates a scale factor to scale from pixel dimensions in the input images to real-world dimensions. In another embodiment, a scale factor is received by the 3D generation module in order to scale the body part mesh.

In one embodiment, the body part mesh 220 is a scaled structured mesh. Structured and unstructured meshes differ by their connectivity. An unstructured mesh has irregular connectivity between vertices, requiring the explicit listing of the way vertices make up individual mesh elements. Unstructured meshes therefore allow for irregular mesh elements but require the explicit storage of adjacent vertex relationships, leading to lower storage efficiency and lower resolution. A structured mesh, however, has regular connectivity between its vertices (i.e., mesh elements and vertex distances are predefined), leading to higher space and storage efficiency, and superior resolution.

Key point annotation is the process of annotating a user image, or an unstructured mesh derived from one or more user images, by detecting key points for the mesh representation of the target body part (e.g., on the body part surface). Key point detection and annotation are important required stages for the generation of the body part mesh 220. Annotation is the generation of annotation key points indicating salient features of the target body part. Key point annotation may be carried out using one or more 3D key point DLNs or 2D key point DLNs that have been trained on a specific body part.

Key point detection falls under the broad category of landmark detection. Landmark detection is a category of computer vision applications where DLNs are commonly used. Landmark detection denotes the identification of salient features in 2D or 3D imaging data and is widely used for purposes of localization, object recognition, etc. Various landmark detection DLNs such as PointNet, Stacked Hourglass Convolutional Neural Network (CNN), HRNet, Feed-Forward Neural Network (FFNN), Faster Regional Convolutional Neural Network (Faster R-CNN), and various other Convolutional Neural Network (CNNs) were designed for landmark detection. The key point DLN 212 can be based on any landmark detection machine learning algorithm.

To carry out key point detection and annotation, the key point DLN 212 must be trained beforehand using training data sets including body part photos and corresponding body part meshes. Key point DLNs can be trained to detect key points for a specific type of body part. In some embodiments, segmentation (i.e., the separation of the body part from the input image background) and annotation can be carried out through multiple DLNs or DLN stages. The detected key points may form the entirety of the points comprising a body part mesh or may form a subset of the points comprising the body part mesh.

Various algorithms are within the scope of the present invention for constructing a body part mesh 220 from images of a body part 210. One alternative embodiment in accordance with embodiments of the present invention is described in FIG. 4 of PCT Application No. PCT/US20/70465. Examples of the images and 3D meshes constructed from the images by a photogrammetry process are described, in accordance with embodiments of the present invention, in FIG. 5 of PCT application No. PCT/US20/70465. Other alternative embodiments are described in FIGS. 2 and 3 of PCT Application No. PCT/US21/14549, where a scale factor is derived. PCT Applications No. PCT/US20/70465 and PCT/US21/14549 are hereby incorporated by reference in their entirety herein as if fully set forth herein. Implementation of other algorithms may involve different steps or processes in the construction of a 3D mesh of the target body part. An additional key point deep-learning network (DLN) 214 may be used to generate additional key points for the body part mesh 220. In one embodiment, this step is performed to upscale the body part mesh 220, where upscaling refers to any mesh refinement process that increases mesh resolution. The additional key point DLN 214 may be trained beforehand using an additional training data set including additional body part photos and corresponding additional body part meshes. Upscaling may also be performed as an additional step (not shown in FIG. 2) after the extraction of the body part mesh 220 and before the identification of a product mesh subset 230, and may rely only on the extracted body part mesh 220 as its input. In this embodiment, an upscaling DLN may be trained to generate an upscaled body part mesh from the extracted body part mesh 220 using a training data set including body part meshes and corresponding upscaled body part meshes. The benefits of upscaling mesh data include the generation of higher quality data (e.g., higher resolution) for applications, more consistent product quality, more advanced body-part feature identification, and enabling new applications on the user device. Upscaling may also be used to normalize the resolutions and geometric characteristics of various meshes generated through different processes (e.g., using third-party mesh-generation libraries).

In the following step of FIG. 2, a product mesh subset 230 is identified 222 from the extracted body part mesh 220, in accordance with one embodiment of the present invention. The product mesh subset 230 is a set of key points that are selected from the body part mesh 220 and that represent salient features of the body part that are relevant to the target product. In the example of FIG. 2, the product mesh subset 230 is a set of key points identified from the body part mesh 220 including the approximate end-points of the area of the body part mesh 220 that is to be covered by the target product. The product mesh subset 230 may also include key points representing salient body features that are to be covered by the product. In the case of a face mask, these salient features may include the tip of the user's nose, the tip of the user's chin, and the center of the user's mouth, as shown in FIG. 2. In various embodiments, the product mesh subset indicates important product features around which the product is built.

The identification 222 of the product mesh subset 230 may be carried out manually by a human annotator or automatically through a computer. In one embodiment, the identification of a product mesh subset 230 relies on the superposition of a scaled product mesh template over the extracted body part mesh 220. Such a product mesh template may be selected from a database 102 connected to a user's electronic device 112. FIG. 2 shows an alternative method of identifying the product mesh subset using a product mesh subset DLN 224, where the product mesh subset DLN 224 was trained using a training data set including body part meshes and corresponding product mesh subsets. Product mesh subset DLNs can be trained to identify product mesh subsets for a specific type of product (e.g., face mask, glove, shoe, scarf, hat, watch, ring, glasses) from a specific body part (e.g., head, hand, wrist, foot, face, neck).

In the following step of FIG. 2, a product mesh 240 is generated from the identified product mesh subset 230, in accordance with one embodiment of the present invention. The product mesh 240 is a scaled 3D model of the target product, is generated to fit the user's body part, and includes key points that represent salient features of the target product. Specifically, the key points of the product mesh may describe the endpoints, the edges, the skeletal features, and the structural features of the target product. While the body part mesh 220 and product mesh 240 may be structured or unstructured, they must be scaled in order to provide an accurate preview of the product to the viewer and/or accurate product dimensions.

In one embodiment, the product mesh is identical to the product mesh subset. In another embodiment, the product mesh is generated from the product mesh subset using one or more 3D geometrical transformations such as an enlargement or a similarity. In yet another embodiment, the product mesh includes the product mesh subset key points along with additional key points that are distinct from the key points of the identified product mesh subset. For example, the product mesh may be an upscaled version of the product mesh subset. In other embodiments, the product mesh consists entirely of key points that are distinct from the key points including the product mesh subset.

The generation 232 of the product mesh 240 may be carried out manually by a human annotator or automatically through a computer. In one embodiment, the generation of a product mesh 240 includes the resizing of a product mesh template based on the product mesh subset 230. FIG. 2 shows an alternative method of generating the product mesh using a product mesh DLN 234, where the product mesh DLN 234 was trained using a training data set including product mesh subsets and corresponding product meshes. Product mesh DLNs can be trained to identify product meshes for a specific type of product (e.g., face mask, glove, shoe, scarf, hat, watch, ring, glasses) from a specific body part (e.g., head, hand, wrist, foot, face, neck).

In the following step of FIG. 2, a set of product dimensions 250 are generated from the product mesh 240, in accordance with one embodiment of the present invention. The generation of product dimensions may be based on the selection of a subset of the key points of the product mesh. The subset of key points selected here from the product mesh is referred to as product key points. In FIG. 2, the selection of product key points and the subsequent generation of product dimensions based on the selected key points are represented together as a single selection/generation step 242.

The product key points selected in view of generating product dimensions 250 may represent salient product features relevant to the shape (e.g., tips, endpoints, edges) or structure (e.g., midpoints, axes, median lines) of the target product. The selected product key points may also correspond to the shape and/or structure of a 2D template to be generated in view of the manufacturing of the target product for the user.

The generation 242 of the product dimensions 250 may be carried out directly on the scaled product mesh 240 by a computer algorithm that generates the real-world distances between the selected product mesh key points in 3D virtual space. FIG. 2 shows an alternative method of generating the product dimensions 250 using a product dimensions DLN 244, where the product dimensions DLN 244 was trained using a training data set including product meshes and corresponding product dimensions. Product dimension DLNs can be trained to generate product dimensions for a specific type of product (e.g., face mask, glove, shoe, scarf, hat, watch, ring, glasses) from a specific body part (e.g., head, hand, wrist, foot, face, neck).

Extended DLN Embodiments

Further DLN-based embodiments (not shown in FIG. 2) are within the scope of the present invention. In particular, a DLN may be designed and trained to combine two or more steps from FIG. 2.

In one such embodiment, the product mesh 240 can be generated directly from the body part mesh 220 using a body-to-product DLN that was trained using a training data set including body part meshes and corresponding product meshes. In another embodiment, the product dimensions 250 can be generated directly from the body part mesh 220 using a body-to-dimensions DLN that was trained using a training data set including body part meshes and corresponding product dimensions.

Similarly, the product mesh 240 can be generated directly from the body part images 210 using an image-to-product DLN that was trained using a training data set including body part images and corresponding product meshes. Ultimately, the product dimensions 250 can be generated directly from the body part images 210 using an image-to-dimensions DLN that was trained using a training data set including body part images and corresponding product dimensions.

The DLN algorithms listed above for the various DLN applications disclosed herein (e.g., architecture described) are only illustrative algorithms that are within the scope of the present invention, and the present invention is not limited to the use of the listed DLN algorithms. Other DLN algorithms are also within the scope of the present invention. Moreover, other machine learning (ML) methods may be used instead of or in combination with the various listed DLN algorithms. Other ML algorithms including, but not limited to, regressors, nearest neighbor algorithms, decision trees, support vector machines (SVM), Adaboost, Bayesian networks, fuzzy logic models, evolutionary algorithms, and so forth, are hence within the scope of the present invention.

Illustrative Product Mesh and Dimension Generation Process

Figure 3:
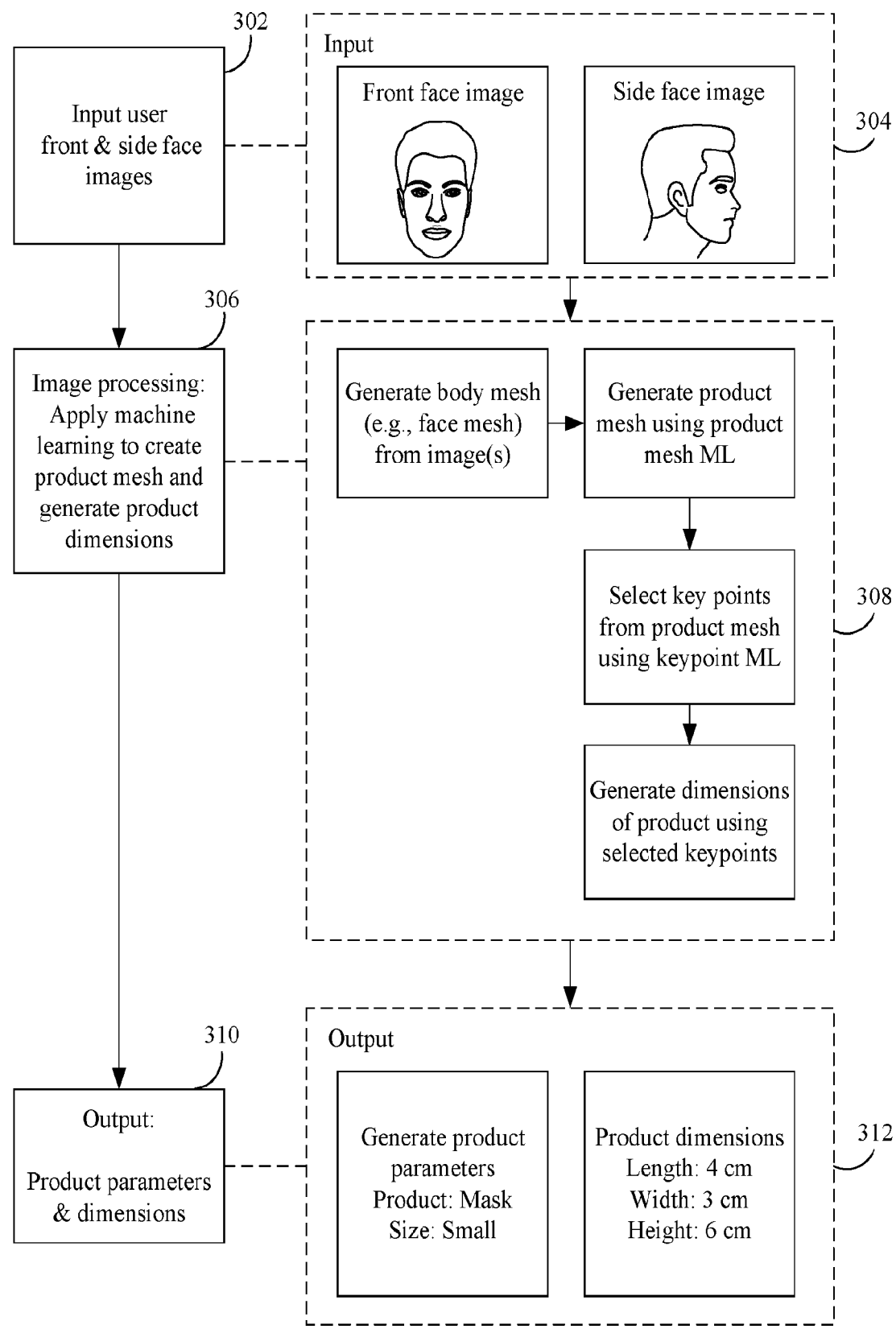
FIG. 3 illustrates an example flow chart for generating dimensions of a product using machine learning, in accordance with one embodiment of the present invention.

FIG. 3 illustrates an example flow chart for generating dimensions of a product using machine learning, in accordance with one embodiment of the present invention. In step 302 of FIG. 3, input data 304, which may include a front image and side image of a body part is received. In step 306, one or more image processing steps are applied, such as image selection, filtering, cropping, zooming, or scaling. In step 308, a body part mesh (e.g., face mesh) is generated from the received front and side images using a body part mesh machine learning (ML) module. In one embodiment, the body part mesh ML module utilizes a key point DLN for generating a 3D mesh model of the body part (e.g., user's face) from the one or more input images, where the 3D mesh model includes a plurality of key points, and where the key point DLN was trained on key point training data including one or more images of one or more sample users and a set of body part key points for the one or more sample users.

In step 308, a product mesh is generated using a product mesh machine learning (ML) module including one or more product mesh deep learning modules (DLN), where the product mesh DLN has been trained on generating a configurable product mesh over the generated face mesh (i.e., body part mesh). In one embodiment, the product mesh DLN is configured to shape a surface or boundary of a configurable product mesh to match the anatomic features of the user's body part (e.g., face). In step 308, one or more key points may also be selected from the product mesh key points to generate dimensions for the product. This product mesh key points selected here are referred to as product key points. The selection of one or more product key points from the product mesh key points may include utilizing a selection key point DLN that has been trained on key point selection training data, where the key points selection training data includes one or more sample user's product mesh and one or more corresponding sample key points for generating dimensions of the product, and where the corresponding sample key points were determined manually by a human annotator or automatically using a computer. In another embodiment, the generation of one or more product dimensions from one or more input key points of the product mesh is carried out by a product dimension DLN, where the product dimension DLN is trained using one or more sample input key points from one or more sample product meshes, and one or more corresponding sample dimensions of the product. The one or more input key points to the product dimension DLN may include the entirety of the product mesh or the product key points from the product mesh that were selected to determine the one or more product dimensions (i.e., the output of the selection process described above).

In one exemplary embodiment, the selection of one or more key points from the product mesh may be used to determine one or more product constraints, where the one or more product constraints include product features configured to match the surface of an anatomic feature of the user, such as a product shape, a product size, a product length, a product height, a product width, a product thickness, a product color, a product pattern, a product finish, and a product style. Finally, in step 310, one or more product parameters, features, and dimensions are output, as shown illustratively in the output data 312. As shown in FIG. 3, the output 312 may include the product parameters and features (i.e., a set of product constraints such as: product type: mask, product size: small, etc.) and/or one or more dimensions of the product (e.g., length: 4 cm, width: 3 cm, and height: 6 cm).

In one exemplary embodiment of the present invention, the 3D product mesh model is configured (e.g., shaped in virtual 3D space) to fit the user's face. The 3D product mesh model is represented as a mesh, with various surface and skeletal key points affected by adjusting to the parameters of the user's face. In one example, the system is configured to analyze the one or more images of the user received by the input module to iteratively perform a sequence of pose estimation, feature detection, and alignment of the product mesh over the constructed user's face mesh. The system may be configured for face shape tracking over a period of time. Further, feature detection includes, but is not limited to, ear location, nose location, eye location, chin location, face edges, top of nose location, etc.

Figure 4:
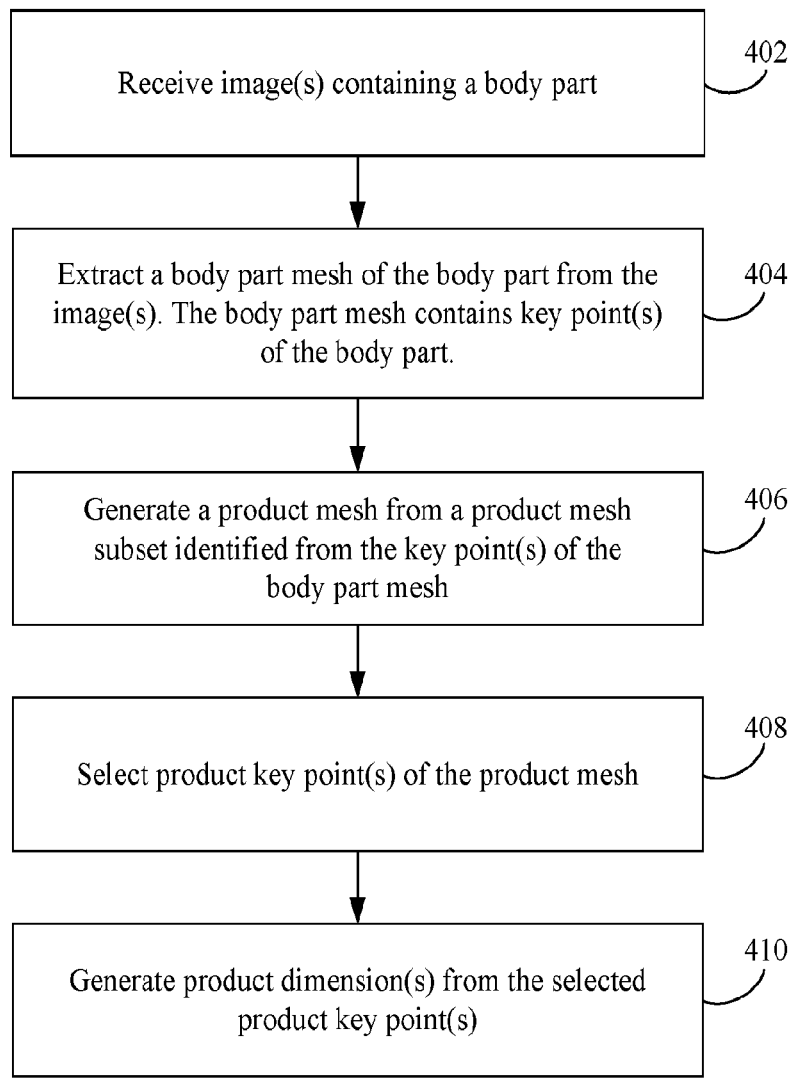
FIG. 4 illustrates an example flow chart for a method for generating dimensions of a product, in accordance with one embodiment of the present invention.

FIG. 4 illustrates an example flow chart for a method for generating dimensions of a product, in accordance with one embodiment of the present invention. The computer-implemented method described in FIG. 4 is executable by a hardware processor, operably coupled to a memory, and that executes the instructions stored in the memory for performing the below mentioned steps. At step 402, the method includes receiving one or more images containing a body part of the user. In one example, the received one or more images of the user include one of a front view of the user's face, a front view of the user's head, a side view of the user's face, a side view of the user's head, and a back view of the user's head. In one embodiment, the one or more images may include an image generated from the output of a 3D-scanner. In one embodiment, the method may also include scanning the body part of the user using a 3D-scanner, and capturing one of a front image, a back image, and a side view image of the body part from an output of the 3D-scanner.

At step 404, the method further includes extracting a body part mesh of the body part from the one or more images, where the body part mesh includes a plurality of key points of the body part. At step 406, the method further includes generating a product mesh from a product mesh subset identified from the plurality of key points of the body part mesh. At step 408, the method further includes selecting one or more product key points of the product mesh. At step 410, the method further includes generating one or more product dimensions from the selected product key points, where the one or more product dimensions constitute measurements of the product specifically configured for the user.

Figure 5:
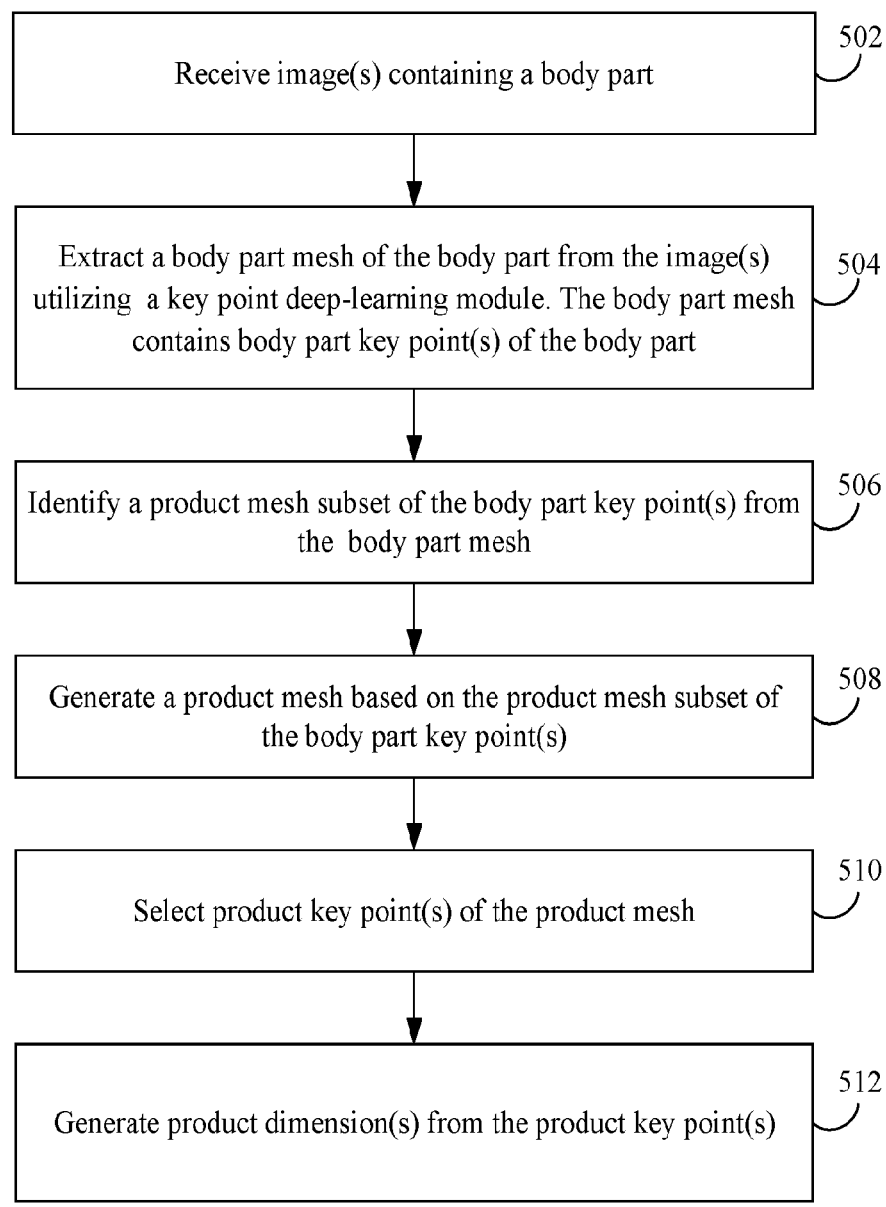
FIG. 5 illustrates an example flow chart for a method for generating a mesh and dimensions of a product, in accordance with one embodiment of the present invention.
Figure 6:
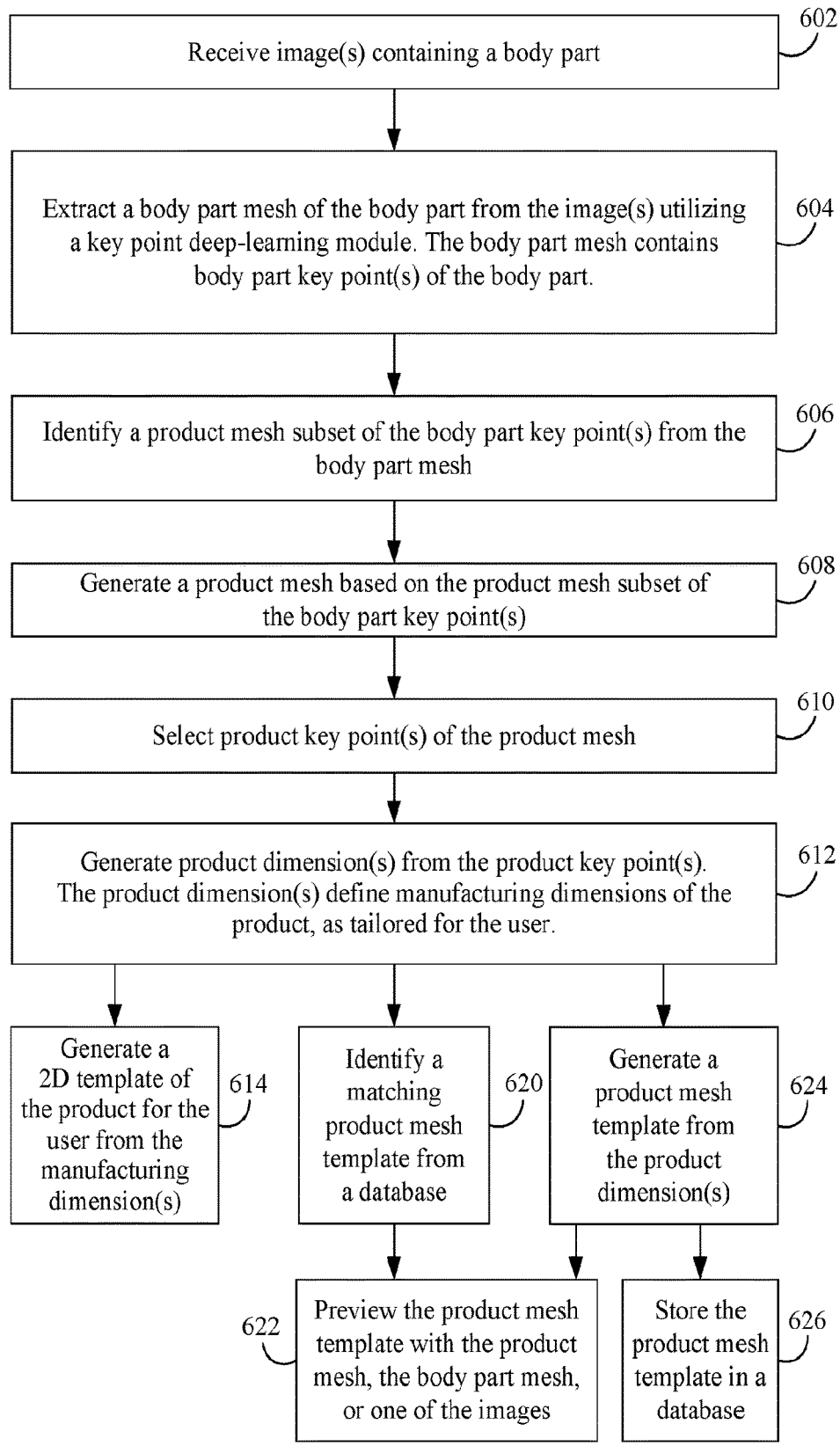
FIG. 6 illustrates an example flow chart for a method for generating manufacturing dimensions, a 2D template, and selectable mesh templates of a product, in accordance with one embodiment of the present invention.

In one example, the one or more product dimensions define manufacturing dimensions of the product for the user. In yet another example, the method generates at least one set of instructions for manufacturing the product to fit the user. In yet another exemplary embodiment, the method is configured for generating a 2D template of the product for the user, where the 2D template is generated based on the manufacturing dimensions of the product for the user. The manufacturing dimensions and 2D templates described in the context of the present invention may be configured and/or formatted to comply with any production or distribution requirements such as requirements for product manufacturing using a specific material (e.g., specific types of paper, wood, metal, leather, fabric, etc.), 3D printing, blueprint design and sharing, and website/cloud storage and distribution. FIGS. 5 and 6 depict steps for the generation of manufacturing dimensions and 2D product templates, in accordance with embodiments of the present invention.

FIG. 5 illustrates an example flow chart for a method for generating a mesh and dimensions of a product, in accordance with one embodiment of the present invention. At step 502, the method includes receiving one or more images containing at least a body part of the user. At step 504, the method includes extracting a body part mesh of at least the body part, from the one or more images, where the body part mesh includes a plurality of body part key points of the body part, and where the extracting utilizes a key point deep-learning module (DLN) for generating the body part mesh from the received one or more images, as discussed in the context of FIG. 2. At step 506, the method further includes identifying a product mesh subset of the plurality of body part key points from the extracted body part mesh. At step 508, the method also includes generating a product mesh based on the identified product mesh subset. At step 510, the method further includes selecting one or more product key points of the product mesh. Finally, at step 512, the method may also include generating one or more product dimensions from the one or more selected product key points, where the one or more product dimensions constitute measurements of the product for the user.

FIG. 6 illustrates an example flow chart for a method for generating manufacturing dimensions, a 2D template, and selectable mesh templates of a product, in accordance with one embodiment of the present invention. Steps 602-606 are similar to the steps described in FIG. 5. At step 602, the method includes receiving one or more images containing at least a body part of the user. At step 604, the method includes extracting a body part mesh of the body part from the images, where the body part mesh includes a plurality of body part key points of the body part, and where the extracting utilizes a key point deep-learning module (DLN) for generating the body part mesh from the received images, as discussed in the context of FIG. 2. At step 606, the method further includes identifying a product mesh subset of the plurality of body part key points of the body part mesh. At step 608, the method includes generating a product mesh based on the identified product mesh subset. At step 610, the method further includes selecting one or more product key points of the product mesh.

Steps 612-626 relate to the generation of manufacturing dimensions and 2D temples that comply with various manufacturing and distribution requirements, as well as the generation of mesh templates of the product that are selectable by the user and/or adequate for distribution and storage over a communication network. At step 612, the method may include generating one or more product dimensions from the selected product key points, where the one or more product dimensions constitute measurements of the product for the user. The product dimensions generated at step 612 define manufacturing dimensions of the product for the user. At step 614, the method may further include generating a 2D template of the product for the user, where the 2D template is generated based on the manufacturing dimensions of the product for the user. The manufacturing dimensions and 2D templates described in the steps above may be configured and/or formatted to comply with any specific production or distribution requirements, as discussed in the context of FIG. 4. For example, they may include sewing dimensions or blueprints to be printed on paper as required by a seamstress or by an automated sewing process.

At step 624, the method may further include generating a product mesh template based on the product dimensions. In some embodiments, a product mesh template is a standardized mesh of the product that has configurable parameters. For example, a face mask mesh template may be a structured 3D mesh model of a face mask with a range of configurable manufacturing dimensions. In one embodiment, a product mesh template is a product mesh that is configured to fit a category of users (e.g., users requiring small, medium, or large face masks). At step 626, the generated product mesh template is stored in a database (e.g., a cloud-based searchable set of face mask meshes having standardized sizes and classified along product attributes such as style, composition, design, etc.). Therefore, steps 624-626 allow for the generation and storage of product meshes for more than a single use or a single user. At step 620, the method may further include identifying a matching product mesh template for the user. In step 620, the identification may be carried out through access to a database of product mesh templates. Finally, at step 622, the method may further include previewing the matching product mesh template with one of the product mesh, the body part mesh, or one of the user images. For example, the user may be able to view a superposition of the matching product mesh template over a generated 3D model of the user's body part (e.g., face), or the user's face image, as depicted in FIG. 1. The previewing of step 622 may be part of a product retail and/or distribution process on the user's device, as described further in the context of FIG. 11.

Figure 7:
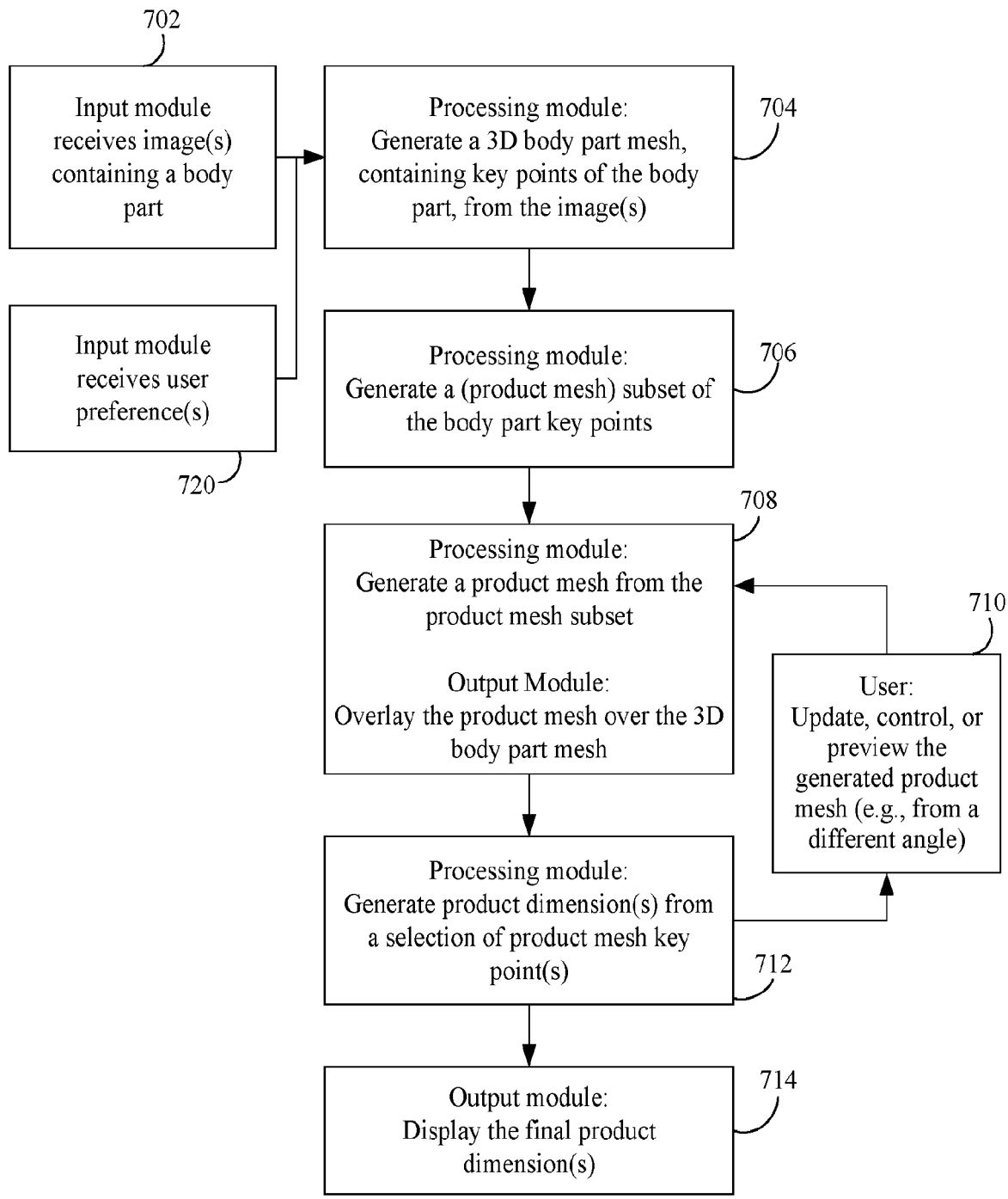
FIG. 7 illustrates an example flow chart for generating dimension of a product, in accordance with another embodiment of the invention.

FIG. 7 illustrates an example flow chart for generating dimension of a product, in accordance with another embodiment of the invention. The overall process starts at step 702, where an input module obtains one or more image(s) of at least a partial body part. At step 702, the input module obtains one or more optional user preferences such as a product shape, a product color, a product pattern, a product finish, or a product style. The user may input a product choice such as a mask, an eyewear, or hat etc., for which a product mesh or dimensions need to be generated, at this step. At step 704, a processing module generates a 3D body part mesh having a plurality of key points of the body part, from the one or more images received by the input module. At step 706, the processing module generates a product mesh subset including a subset of the plurality of key points of the body part mesh. At step 708, the processing module generates a product mesh based on the produce mesh subset, optionally overlaying the product mesh over the 3D body part mesh (e.g., as a preview on a display of the user device). At step 710, an optional user interaction may update, control, or preview the generated product mesh from different angles on a user device's display. In one example, the user may be able to modify or update an attribute of the product mesh such as the shape of its surface, or its edges. The processing module may then generate an updated product mesh and overlay the updated product mesh over the 3D body part mesh, thus looping back to step 708.

Further, at step 712, the processing module generates one or more dimensions of the product, in response to a selection of one or more key points of the product mesh (i.e., product key points). Finally, at step 714, an output module displays the one or more dimensions of the product to the user (e.g., on a display or a sheet of paper via a printer).

In another exemplary embodiment, the processor of the system is configured for receiving from the user an input including a modification of the one or more product parameters received in step 720, updating the one or more dimensions of the product, and further updating the preview of the product mesh and the display of the one or more dimensions of the product.

Example Use Cases of the Present Invention

Figure 8:
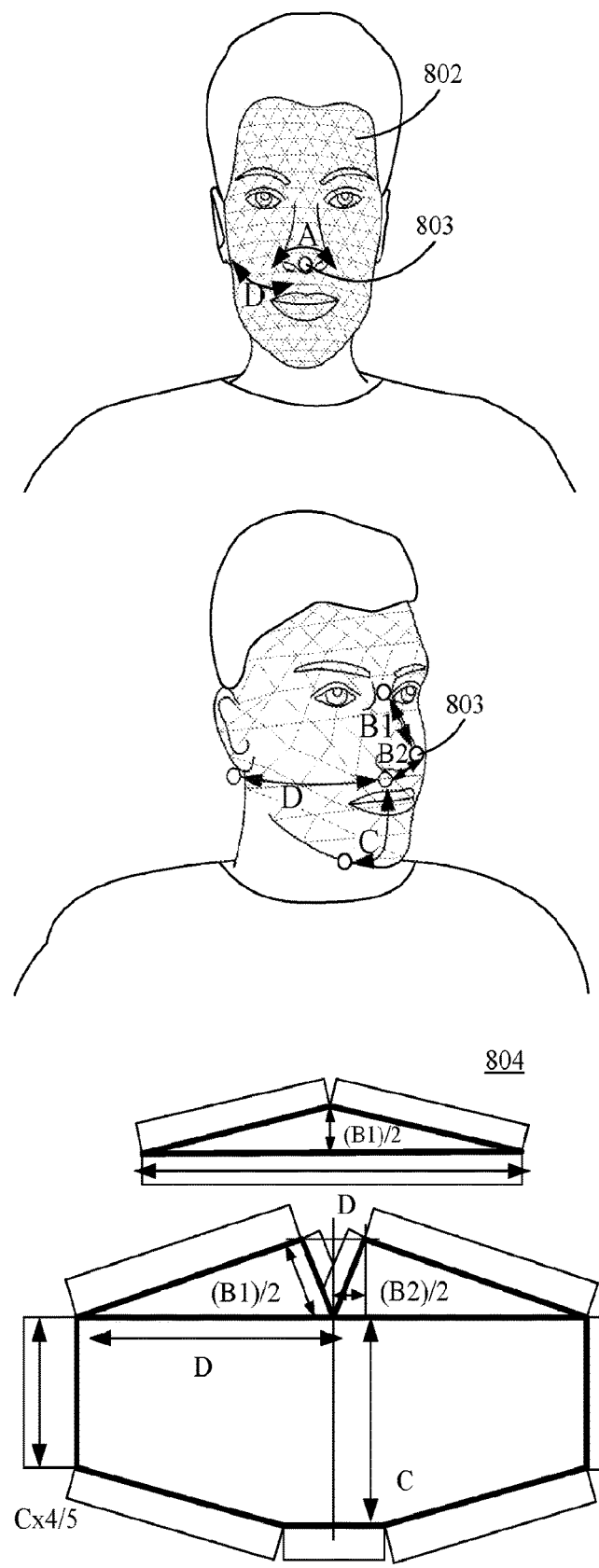
FIG. 8 shows an illustrative diagram of the face mesh (i.e., body part mesh) with selected superposed product key points from the mask mesh (i.e., product mesh) drawn on the user's front and side head views, and a 2D mask template, according to one embodiment of the present invention.
Figure 9:
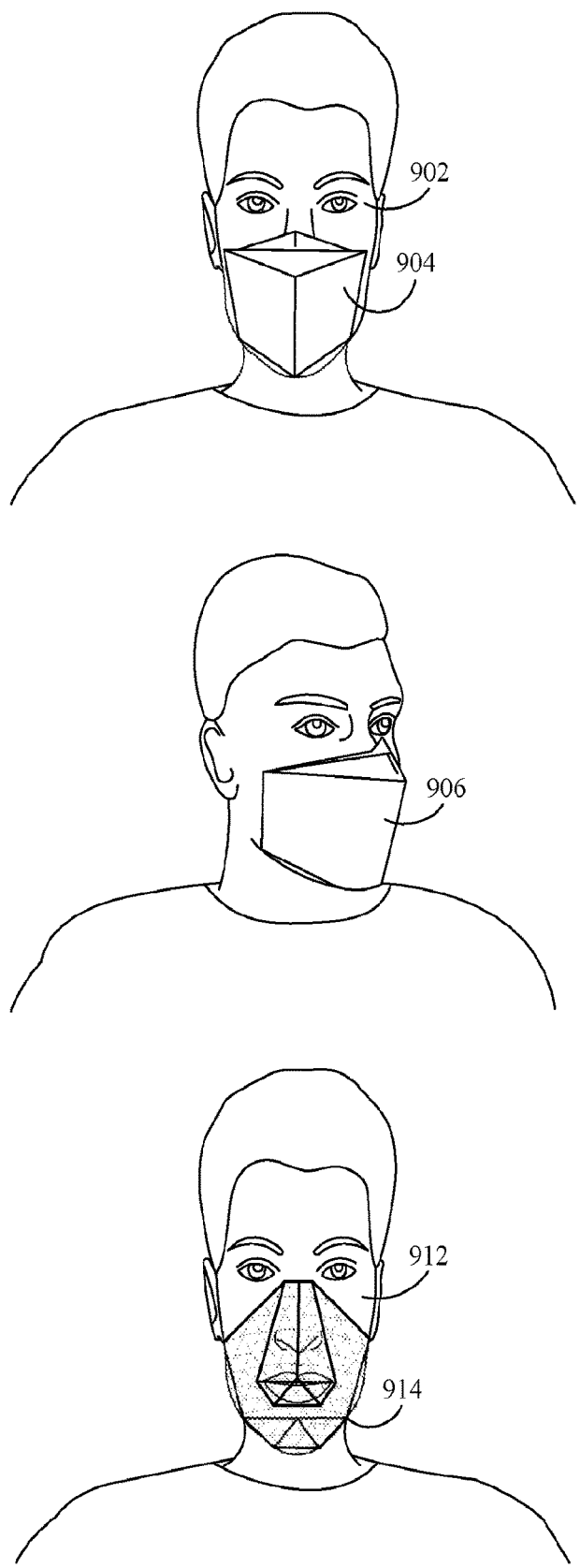
FIG. 9 shows an illustrative diagram of virtual representations of a mask and a mask mesh generated by the system, according to embodiments of the present invention.
Figure 10:
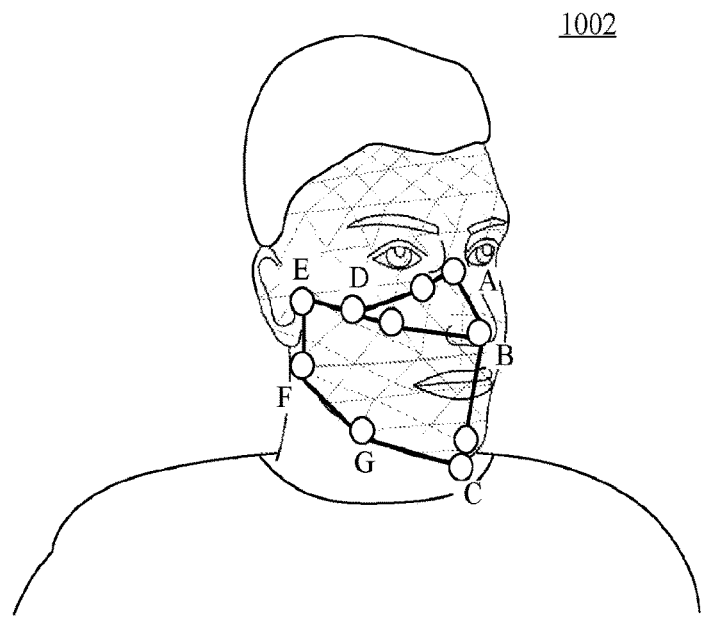
FIG. 10 shows an illustrative diagram of a face mesh (i.e., body part mesh), with emphasized face mask mesh subset (i.e., product mesh subset) key points on the user's side head view, and a corresponding face mask and 2D template showing the selected product key points, according to one embodiment of the present invention.
Figure 10:
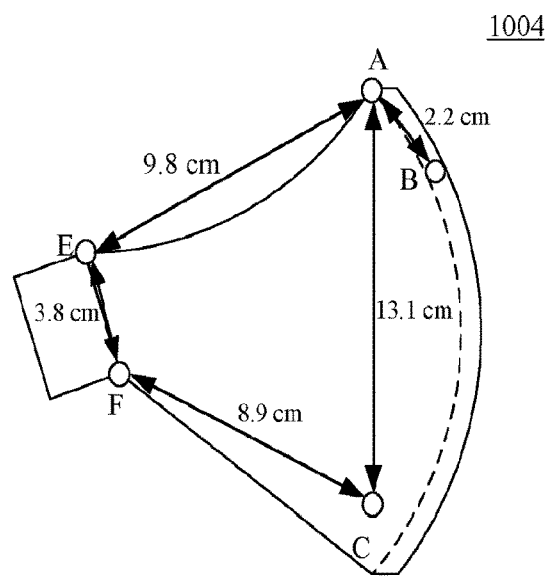
Figure 10:
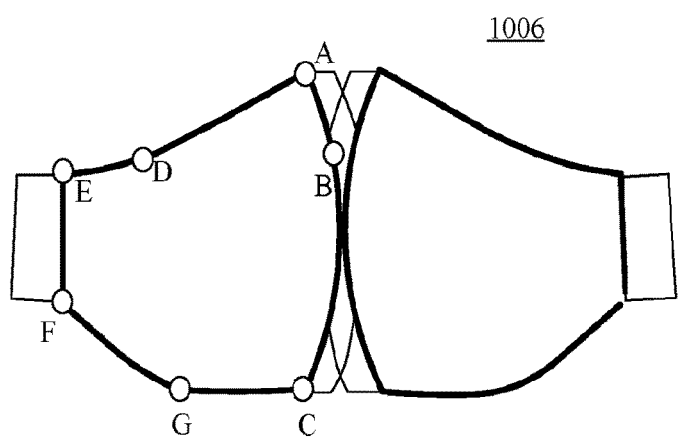

FIGS. 8, 9, and 10 illustrate the methods described herein through various representations of face meshes, face mask meshes, face mask dimensions, and face mask D templates, generated according to various embodiments of the present invention. FIG. 8 shows an illustrative diagram of the face mesh (i.e., body part mesh) with selected superposed product key points from the mask mesh (i.e., product mesh) drawn on the user's front and side head views, and a 2D mask template, according to one embodiment of the present invention.

As shown, a face mesh 802 (i.e., body part mesh) is generated on the front and side head views. The face mesh includes a plurality of key points represented as the intersection of the mesh polygons on FIG. 8. As discussed previously in FIG. 2, to generate face mask mesh dimensions, the system generates a product mesh based on a subset of the face mesh key points. A selection of product key points is then made to determine mask dimensions. FIG. 8 shows a selection of product key points on the front and side head views, such as key point 803 located over the tip of the user's nose.

The product dimensions are based on the distances between the selected key points along the surface of the product mesh. FIG. 8 shows five selected product key points and five surface distances labeled A, B1, B2, C, and D. The labeled surface distances can be generated by program code running in the user device or on a server. FIG. 8 illustrates an exemplary 2D template 804 of a face mask generated by the system from the face mesh 802, showing the generated product dimensions as a function of the previously determined surface distances B1, B2, C, and D between the selected product key points. The 2D template shows the various dimensions required to produce the different mask components, such as their height, width, length, and depth. In one embodiment, the 2D template and mask dimensions may be used for product manufacturing.

FIG. 9 shows an illustrative diagram of virtual representations of a mask and a mask mesh generated by the system, according to embodiments of the present invention. The generation of a mask mesh fitting the head of the user, as shown in FIG. 2, allows the system to generate a virtual mask representation in 3D space. Such a representation may take the form of the product itself. FIG. 9 shows a virtual front view 904 and side view 906 of the mask generated from the 2D template 804 shown in FIG. 8, superposed over the front head view and side head view of the user 902. The methods and systems described herein allow the virtual front 904 and side 906 views of the mask to be aligned with the shape and features of the user's head.

Alternatively, the system may generate a representation of the product mesh, superposed over the user's face. FIG. 9 shows a virtual representation of a generated mask mesh 914 superposed over the front view of the user's head 914. The mask shape 904 and mask mesh 914 shown in FIG. 9 represent different mask designs. Such virtual mask and mask mesh representations may be displayed over the user's existing images, or over newly captured images of the user. The system may dynamically generate mask or mask mesh representations over a steam of images (e.g., a video of a user's head). A user may therefore move their body part (e.g., head) around in order to view a virtual representation of the product mesh or product shape (e.g., face mask) in various poses, on the screen of their device. In various embodiments, the body part deep learning module is used to detect and locate facial feature in order to align and adjust the product mesh over the face mesh dynamically, thus minimizing the error between the detected feature locations and the product mesh (e.g., mask mesh, show mesh, eyewear mesh, hat mesh, etc.).

FIG. 10 shows an illustrative diagram of a face mesh (i.e., body part mesh), with emphasized face mask mesh subset (i.e., product mesh subset) key points on the user's side head view, and a corresponding face mask and 2D template showing the selected product key points, according to one embodiment of the present invention. In FIG. 10, the product mesh subset key points identified from the generated face mesh 1002 are superposed over the face mesh drawn on the user's side head view. They are labeled A, B, C, D, E, F, and G, and correspond to salient points of the face that are relevant to the mask's product mesh and manufacturing dimensions. FIG. 10 shows a corresponding product representation 1002 and 2D template 1004 of the face mask, both displaying the location of the labeled face features. In one embodiment, the face mesh consists of the labeled face mesh subset. In another embodiment, it is the portion of the face mesh that is bounded by the face mesh subset key points. In yet another embodiment, is an upscaled version of the face mesh subset or of the portion of the face mesh that is bounded by the face mesh subset. In other embodiments, it is a geometrical transformation (e.g., enlargement) of the portion of the face mesh that is bounded by the product mesh subset. In yet another embodiment, it is the output of a product mesh DLN trained using one or more face mesh subsets and corresponding face meshes. The product representation 1002 of the face mask also displays the distances separating the product key points (i.e., face mask manufacturing dimensions).

Figure 11:
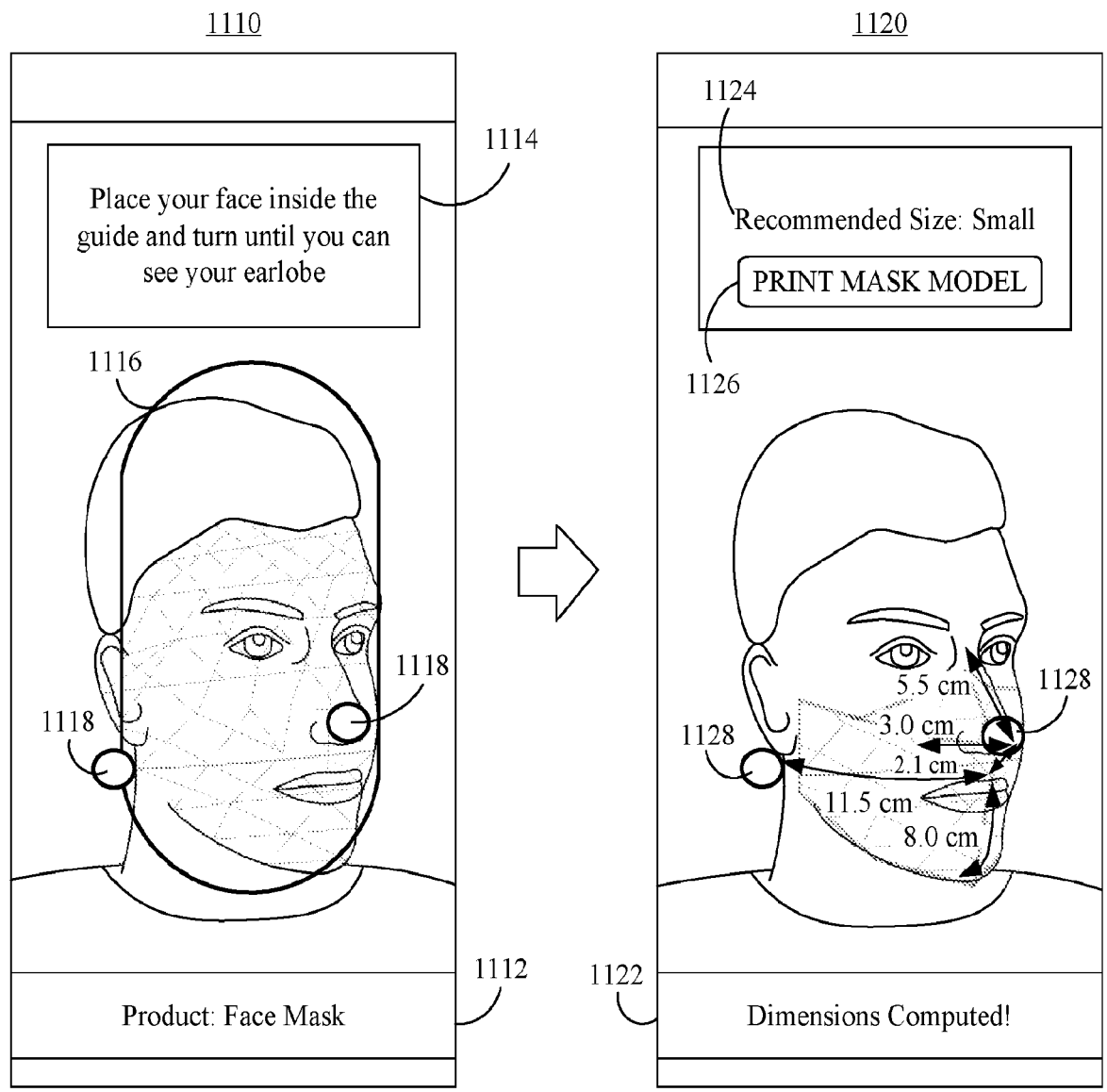
FIG. 11 shows an illustrative user flow through two graphical user interfaces (GUIs) implementing one embodiment of the present invention, where the user is guided from a face imaging angle to face mask dimensions and printing a product model, according to one embodiment of the present invention.

FIG. 11 shows an illustrative user flow through two graphical user interfaces (GUIs) implementing one embodiment of the present invention, where the user is guided from a face imaging angle to face mask dimensions and printing a product model, according to one embodiment of the present invention. The user in FIG. 11 is enabled, through a first input GUI 1110, to capture a front or a side head view image using the electronic device, where the product selected by the user is displayed by the GUI 1112. The GUI displays instructions 1114 and an AR guide 1116 to assist the user in positioning their body part (e.g., face). As shown in FIG. 11, the processing module is configured to generate a face mesh and detect user feature locations such as the location of the bottom tip of the ear or and tip of the nose 1118. The body part feature locations 1118 are displayed on the GUI. The processing module then executes the methods described herein in order to generate a face mask mesh and face mask dimensions, as shown in the second output GUI 1120. In an exemplary embodiment, the product mesh generation is influenced by parameters such as eye location, ear location, nose length, nose width, cheekbone structure, face width, face length, ear size, brow position and size, distance between the eyes etc.

In the embodiment of FIG. 11, the output GUI 1120 may include a message for the user 1122 indicating that the dimensions of the product are successfully computed. The output GUI 1120 may also include a button 1126 enabling the user to print a product model such as a 2D template to be printed on paper or fabric, or a 3D model to be printed using a 3D printer. In another embodiment (not shown in FIG. 11), the GUI may include an option for the user to generate manufacturing instructions based on the displayed product mesh.

The output GUI 1120 may track the user's face in real time while displaying the product mesh, as discussed in the context of FIG. 9. In the embodiment of FIG. 11, the output GUI 1120 may include a recommended product size 1124 that fits the user (e.g., small, medium or large), based on the generated product mesh and dimensions. In one embodiment, the processing module accesses a database containing pre-set product models having pre-set styles and dimensions, determining and selecting the best fit for the user. In another embodiment, the electronic device accesses a database of product meshes with pre-set sizes and displays the best fit on the screen. In one example, the system is configured to generate measurements and display a model of a plurality of garments using the body part mesh and feature locations.

Figure 12:
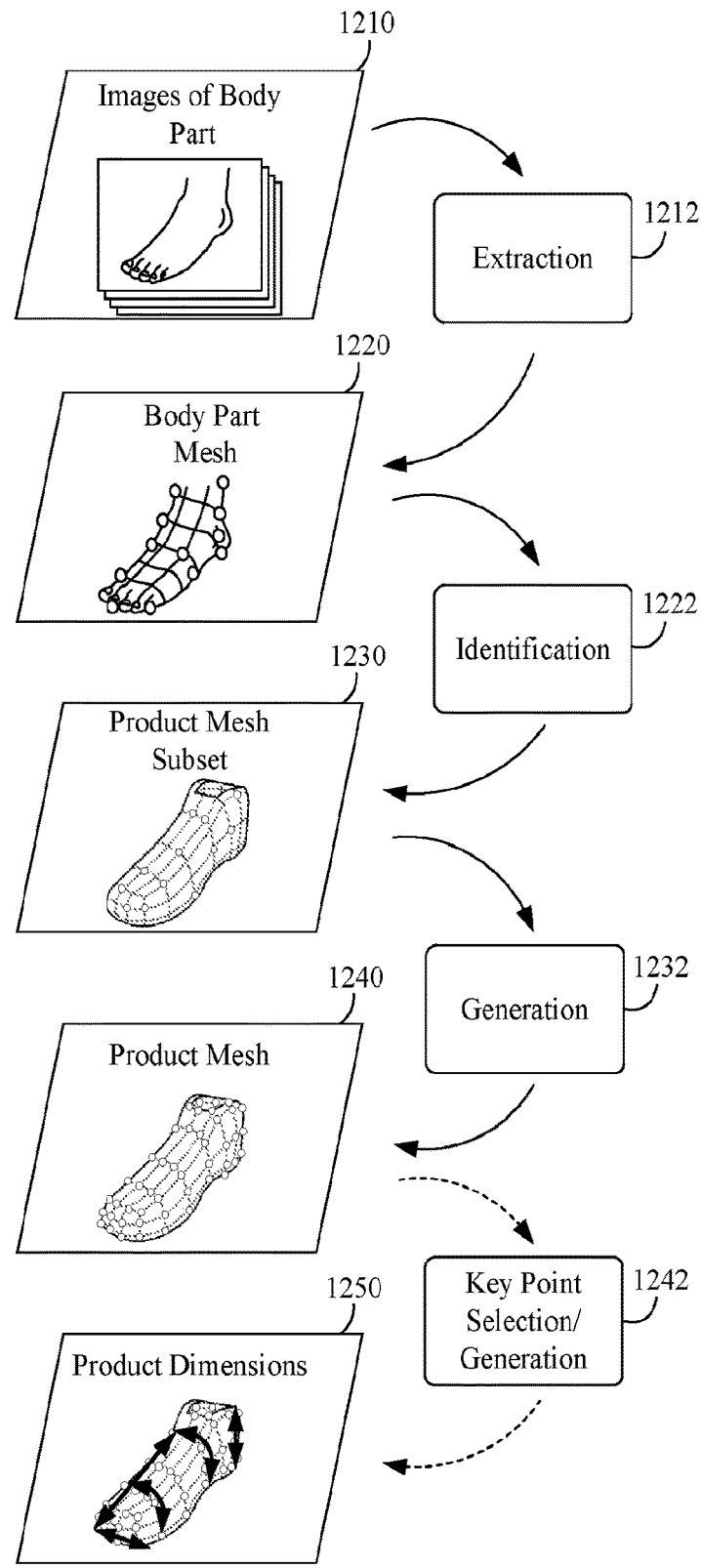
FIG. 12 illustrates an example block diagram for generating a mesh and dimensions of a shoe from a user's foot images using machine learning, in accordance with one embodiment of the present invention.

FIG. 12 illustrates an example block diagram for generating a mesh and dimensions of a shoe from a user's foot images using machine learning, in accordance with one embodiment of the present invention. As in FIG. 2, FIG. 12 shows three major steps involved in the generation of a product mesh 1240 from the images of the body part of a user 1210, according to an embodiment of the present invention, where the body part is a foot and the product is a show or any footwear. The three steps include the extraction of a foot mesh 1220, the identification of a shoe mesh subset 1230, and the generation of a shoe mesh 1240. An additional step consisting of the generation of shoe dimensions 1250 based on a selection of one or more key points from the shoe mesh 1240 is also shown.

In the example of FIG. 12, one or more images of the user's foot 1210 be captured using the user's device. A foot mesh 1220 is then extracted 1212 from the input images 1210, where a key point deep-learning network (DLN) may be used to generate the foot mesh 1220. To carry out key point detection and annotation, the key point DLN must be trained beforehand using training data sets including foot images and corresponding foot meshes.

In the following step of FIG. 12, a foot mesh subset 1230 is identified 1222 from the extracted foot mesh 1220, where the shoe mesh subset 1230 is a set of key points that are selected from the foot mesh 1220 and that represent salient features of the foot that are relevant to the target shoe product. The identification 1222 of the shoe mesh subset 1230 may be carried out manually by a human annotator or automatically through a computer.

In the following step of FIG. 12, a shoe mesh 1240 is generated from the identified shoe mesh subset 1230, in accordance with one embodiment of the present invention. The shoe mesh 1240 is a scaled 3D model of the target product, is generated to fit the user's foot, and includes key points that represent salient features of the target shoe product. In one embodiment, the shoe mesh is identical to the shoe mesh subset. In another embodiment, the shoe mesh is generated from the shoe mesh subset using one or more 3D geometrical transformations such as enlargements or similarities. In yet another embodiment, the shoe mesh includes the shoe mesh subset key points along with additional key points that are distinct from the key points of the identified shoe mesh subset. For example, the shoe mesh may be an upscaled version of the shoe mesh subset. In other embodiments, the shoe mesh consists entirely of key points that are distinct from the key points including the shoe mesh subset.

The generation 1232 of the shoe mesh 1240 may be carried out manually by a human annotator or automatically through a computer. In one embodiment, the generation of a shoe mesh 1240 includes the resizing of a shoe mesh template based on the shoe mesh subset 1230. In another embodiment, the generation of the foot mesh uses a foot mesh DLN trained using a training data set including foot mesh subsets and corresponding foot meshes.

In the following step of FIG. 12, a set of shoe dimensions 1250 are generated from the shoe mesh 1240. The generation of shoe dimensions may be based on the selection of a subset of the key points of the shoe mesh (i.e., product key points). In FIG. 12, the selection of product key points and the subsequent generation of shoe dimensions based on the selected key points are represented together as a single selection/generation step 1242.

The generation 1242 of the shoe dimensions 1250 may be carried out directly on the scaled shoe mesh 1240 by a computer algorithm that generates the real-world distances between the selected shoe mesh key points in 3D virtual space. An alternative method of generating the shoe dimensions 1250 is to use a product dimensions DLN trained using a shoe meshes and corresponding shoe dimensions.

Body-Part Key Point Generation, Body-Part Mesh Generation, and DLN Training

As mentioned in the context of FIG. 2, various algorithms are within the scope of the present invention for constructing a body part mesh from images of a body part. One alternative embodiment in accordance with embodiments of the present invention is described in FIG. 4 of PCT Application No. PCT/US20/70465. Examples of the images and 3D meshes constructed from the images by a photogrammetry process are described, in accordance with embodiments of the present invention, in FIG. 5 of PCT Application No. PCT/US20/70465. Other alternative embodiments are described in FIGS. 2 and 3 of PCT Application No. PCT/US21/14549, where a scale factor is derived. PCT Applications No. PCT/US20/70465 and PCT/US21/14549 are hereby incorporated by reference in their entirety herein as if fully set forth herein. Implementation of other algorithms may involve different steps or processes in the construction of a 3D mesh of the target body part.

In some embodiments, the training of the deep learning networks may be performed using training data that is generated as described in related application U.S. Ser. No. 16/517,391, which issued as U.S. Pat. No. 10,489,683, which itself claims priority from U.S. Ser. No. 62/780,737, the entire disclosures of which are hereby incorporated by reference herein.

In other embodiments, the training of the deep learning networks may be performed using training data that is generated as described in related applications U.S. Ser. No. 16/697,146, which issued as U.S. Pat. No. 11,010,896, the entire disclosure of which is hereby incorporated by reference herein.

The generation of body part key points is described in the context of generating and using segmented and annotated body parts to estimate body-part measurements, as described in U.S. Pat. No. 10,321,728, which is hereby incorporated by reference herein.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be in direct or indirect communication with, for example, one another over the same or different wired or wireless networks. Additionally, while FIGS. 13 and 14 illustrate the various system entities as separate, standalone entities, the various embodiments are not limited to this particular architecture.

Exemplary Management Computing Entity

FIG. 13 provides a schematic of a server (management computing entity) (1302) according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (1302) may also include one or more communications interfaces (1310) for communicating with various computing entities, such as by communicating data, content, and/or information (similar terms used herein interchangeably) that can be transmitted, received, operated on, processed, displayed, stored, and/or the like.

As shown in FIG. 13, in one embodiment, the management computing entity (1302) may include or be in communication with one or more processors (i.e., processing elements) (1304) (also referred to as processors and/or processing circuitry—similar terms used herein interchangeably) that communicate with other elements within the management computing entity (1302) via a bus, for example. As will be understood, the processor (1304) may be embodied in a number of different ways. For example, the processor (1304) may be embodied as one or more complex programmable logic devices (CPLDs), microprocessors, multi-core processors, coprocessing entities, application-specific instruction-set processors (ASIPs), microcontrollers, and/or controllers. Further, the processor (1304)

may be embodied as one or more other processing devices or circuitry. The term circuitry may refer to an entire hardware embodiment or a combination of hardware and computer program products. Thus, the processor (1304) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (1304) may be configured for a particular use or configured to execute instructions stored in volatile or non-volatile (or non-transitory) media or otherwise accessible to the processor (1304). As such, whether configured by hardware or computer program products, or by a combination thereof, the processor (1304) may be capable of performing steps or operations according to embodiments of the present disclosure when configured accordingly.

In one embodiment, the management computing entity (1302) may further include or be in communication with non-transitory memory (also referred to as non-volatile media, non-volatile storage, non-transitory storage, memory, memory storage, and/or memory circuitry—similar terms used herein interchangeably). In one embodiment, the non-transitory memory or storage may include one or more non-transitory memory or storage media (1306), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity (1302) may further include or be in communication with volatile media (also referred to as volatile storage, memory, memory storage, memory and/or circuitry—similar terms used herein interchangeably). In one embodiment, the volatile storage or memory may also include one or more volatile storage or memory media 1308, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (1304). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (1302) with the assistance of the processor (1304) and operating system.

As indicated, in one embodiment, the management computing entity (1302) may also include one or more communications interfaces (1310) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (1302) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity (1302) may include or be in communication with one or more input elements, such as a keyboard input, a mouse input, a touch screen/display input, motion input, movement input, audio input, pointing device input, joystick input, keypad input, and/or the like. The management computing entity (1302) may also include or be in communication with one or more output elements (not shown), such as audio output, video output, screen/display output, motion output, movement output, and/or the like.

As will be appreciated, one or more of the components of the management computing entity (1302) may be located remotely from other management computing entity (1302) components, such as in a distributed system. Furthermore, one or more of the components may be combined and additional components performing functions described herein may be included in the management computing entity (1302). Thus, the management computing entity (1302) can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 14 provides an illustrative schematic representative of a client (user computing entity) (1402) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities (1402) can be operated by various parties. As shown in FIG. 14, the user computing entity (1402) can include an antenna (1404), a transmitter (1408) (e.g., radio), a receiver (1410) (e.g., radio), and a processor (i.e., processing element) (1406) (e.g., CPLDs, microprocessors, multi-core processors, coprocessing entities, ASIPs, microcontrollers, and/or controllers) that provides signals to and receives signals from the transmitter (1408) and receiver (1410), respectively.

The signals provided to and received from the transmitter (1408) and the receiver (1410), respectively, may include signaling information in accordance with air interface standards of applicable wireless systems. In this regard, the user computing entity (1402) may be capable of operating with one or more air interface standards, communication protocols, modulation types, and access types. More particularly, the user computing entity (1402) may operate in accordance with any of a number of wireless communication standards and protocols, such as those described above with regard to the management computing entity (1402). In a particular embodiment, the user computing entity (1402) may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity (1402) may operate in accordance with multiple wired communication standards and protocols, such as those described above with regard to the management computing entity (1402) via a network interface (1414).

Via these communication standards and protocols, the user computing entity (1402) can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity (1402) can also download changes, add-ons, and updates, for instance, to its firmware, software (e.g., including executable instructions, applications, program modules), and operating system.

According to one embodiment, the user computing entity (1402) may include location determining aspects, devices, modules, functionalities, and/or similar words used herein interchangeably. For example, the user computing entity (1402) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's (1402) position in connection with a variety of other systems, including cellular towers, Wi-Fi access points, and/or the like. Similarly, the user computing entity (1402) may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity (1402) may also include a user interface (that can include a display (1412) coupled to a processor (1406) and/or a user input interface coupled to a processor (1406). For example, the user interface may be a user application, browser, user interface, and/or similar words used herein interchangeably executing on and/or accessible via the user computing entity (1402) to interact with and/or cause display of information from the management computing entity (1402), as described herein. The user input interface can include any of a number of devices or interfaces allowing the user computing entity (1402) to receive data, such as a keypad (1416) (hard or soft), a touch display, voice/speech or motion interfaces, or other input device. In embodiments including a keypad (1416), the keypad (1416) can include (or cause display of) the conventional numeric (0-9) and related keys (#, *), and other keys used for operating the user computing entity (1402) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity (1402) can also include volatile storage or memory (1418) and/or non-transitory (or non-volatile) storage or memory (1420), which can be embedded and/or may be removable. For example, the non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store databases, database instances, database management systems, data, applications, programs, program modules, scripts, source code, object code, byte code, compiled code, interpreted code, machine code, executable instructions, and/or the like to implement the functions of the user computing entity (1402). As indicated, this may include a user application that is resident on the entity or accessible through a browser or other user interface for communicating with the management computing entity (1302) and/or various other computing entities.

In another embodiment, the user computing entity (1402) may include one or more components or functionality that are the same or similar to those of the management computing entity (1302), as described in greater detail above. As will be recognized, these architectures and descriptions are provided for exemplary purposes only and are not limiting to the various embodiments.

Exemplary Client Server Environment

The present invention may be implemented in a client server environment. FIG. 15 shows an illustrative system architecture for implementing one embodiment of the present invention in a client server environment. User devices (i.e., image-capturing device) (1502) on the client side may include smart phones (1504), laptops (1506), desktop PCs (1508), tablets (1512), or other devices. Such user devices (1502) access the service of the system server (1514) through some network connection (1510), such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

What is claimed is:

1. A computer-implemented method for generating a 3D mesh model of a product for a user, the computer-implemented method executable by a hardware processor, the method comprising:
   receiving one or more images containing a body part of the user;
   extracting a body part mesh of the body part from the one or more images, wherein the body part mesh comprises a plurality of body part key points of the body part, and wherein the extracting utilizes a key point deep learning module for generating the body part mesh from the one or more images;
   identifying a product mesh subset of the plurality of body part key points from the extracted body part mesh utilizing a product mesh subset deep learning module that has been trained on a product mesh subset training data set,
      wherein the product mesh subset training data set comprises one or more sample body part meshes for one or more sample users and a set of sample product mesh subsets for the one or more sample users, and
      wherein the product mesh subset deep learning module takes as input the extracted body part mesh; and
   generating a product mesh based on the identified product mesh subset of the plurality of body part key points utilizing a product mesh deep learning module that has been trained on a product mesh training data set,
      wherein the product mesh training data set comprises one or more sample product mesh subsets for one or more sample users and a set of sample product meshes for the one or more sample users, and
      wherein the product mesh deep learning module takes as input the identified product mesh subset.

2. The computer-implemented method of claim 1, wherein the key point deep learning module has been trained on key point training data, and wherein the key point training data comprise one or more sample images for one or more sample users and a set of sample key points for the one or more sample users.

3. The computer-implemented method of claim 1, further comprising:
   selecting one or more product key points of the product mesh; and
   generating one or more product dimensions from the one or more product key points, wherein the one or more product dimensions constitute measurements of the product for the user.

4. The computer-implemented method of claim 3, wherein the selection of the one or more product key points of the product mesh comprises:
   determining one or more product constraints, wherein the one or more product constraints are selected from the group consisting of a product shape, a product size, a product length, a product height, a product width, a product thickness, a product color, a product pattern, a product finish, and a product style to match a surface of an anatomic feature of the user.

5. The computer-implemented method of claim 4, further comprising:
   receiving a modification of the one or more product constraints; and
   updating the one or more dimensions of the product, based on the modification of the one or more product constraints.

6. The computer-implemented method of claim 3, wherein the one or more product dimensions define manufacturing dimensions of the product for the user.

7. The computer-implemented method of claim 6, further comprising:
   generating a 2D template of the product for the user, wherein the 2D template is generated based on the manufacturing dimensions of the product for the user.

8. The computer-implemented method of claim 3, further comprising:
   generating a product mesh template based on the one or more product dimensions.

9. The computer-implemented method of claim 8, further comprising:
identifying a matching product mesh template for the user; and
previewing the matching product mesh template with an item selected from the group consisting of the product mesh, the body part mesh, and the one or more images.

10. The computer-implemented method of claim 3,
wherein the generating the one or more product dimensions utilizes a product dimensions deep learning module that has been trained on a product dimensions training data set, and
wherein the product dimensions training data set comprises one or more sample product key points for one or more sample users and a set of sample product dimensions for the one or more sample users.

11. The computer-implemented method of claim 1, wherein the product is selected from the group consisting of a mask, an eyewear, a headwear, and a footwear.

12. The computer-implemented method of claim 1, further comprising:
generating a set of instructions for product manufacturing.

13. The computer-implemented method of claim 1, further comprising:
generating a set of instructions for an item selected from the group consisting of a product style, a product size, a product design, and a product composition.

14. The computer-implemented method of claim 1, wherein the one or more images comprise at least one of a front view of the user's face, a front view of the user's head, a side view of the user's face, a side view of the user's head, and a back view of the user's head.

15. The computer-implemented method of claim 1, further comprising:
scanning the body part of the user using a 3D scanner; and
capturing one of a front image, a back image, and a side view image of the body part from an output of the 3D scanner.

16. The computer-implemented method of claim 1, wherein the one or more images are received from a camera device on a mobile computing device.

17. The computer-implemented method of claim 1, further comprising the following step after the receiving the one or more images:
identifying a plurality of additional key points of the body part, utilizing an additional key point deep learning module that has been trained on additional key point training data, wherein the additional key point training data comprise one or more additional sample images for one or more additional sample users and an additional set of sample key points for the one or more additional sample users,
wherein the plurality of additional key points are different from the plurality of body part key points.

18. The computer-implemented method of claim 1, wherein the product mesh deep learning module is based on a regressor.

19. The computer-implemented method of claim 1, wherein the extracting the body part mesh utilizes an AR (augmented reality) SDK (software development kit) provided in a mobile computing device.

20. The computer-implemented method of claim 1, wherein the product mesh comprises the identified product mesh subset.

21. The computer-implemented method of claim 1, wherein the product mesh comprises a plurality of new key points that are different from the plurality of body part key points.

22. The computer-implemented method of claim 1, wherein the product mesh is a configurable 3D mesh model that is based on a surface or a boundary of the body part mesh and that matches one or more anatomic features of the user.

23. The computer-implemented method of claim 1, wherein the product mesh is configured to allow a buffer space between the body part mesh and the product mesh in order to better fit an anatomic feature of the user.

24. A non-transitory storage medium storing program code, the program code executable by a hardware processor to execute a process for generating a 3D mesh model of a product for a user, the program code configured to:
receive one or more images containing a body part of the user;
extract a body part mesh of the body part from the one or more images, wherein the body part mesh comprises a plurality of body part key points of the body part, and wherein the program code to extract utilizes a key point deep learning module for generating the body part mesh of the body part of the user from the one or more images;
identify a product mesh subset of the plurality of body part key points from the extracted body part mesh utilizing a product mesh subset deep learning module that has been trained on a product mesh subset training data set,
wherein the product mesh subset training data set comprises one or more sample body part meshes for one or more sample users and a set of sample product mesh subsets for the one or more sample users, and
wherein the product mesh subset deep learning module takes as input the extracted body part mesh; and
generate a product mesh based on the identified product mesh subset of the plurality of body part key points utilizing a product mesh deep learning module that has been trained on a product mesh training data set,
wherein the product mesh training data set comprises one or more sample product mesh subsets for one or more sample users and a set of sample product meshes for the one or more sample users, and
wherein the product mesh deep learning module takes as input the identified product mesh subset.

25. The non-transitory storage medium of claim 24, further comprising program code configured to:
generate an upscaled body part mesh from the extracted body part mesh, using an upscaling key point deep learning module that has been trained on upscaling training data,
wherein the upscaling training data comprise a set of body part meshes and a set of corresponding upscaled body part meshes, and
wherein the product mesh subset is identified from the upscaled body part mesh.

* * * * *